US009578497B2

(12) United States Patent
L'Heureux et al.

(10) Patent No.: US 9,578,497 B2
(45) Date of Patent: Feb. 21, 2017

(54) APPLICATION PROGRAMMING INTERFACE FOR ENHANCED WIRELESS LOCAL AREA NETWORK ROUTER

(76) Inventors: Israel L'Heureux, Monaco (MC); Mark D. Alleman, Portland, OR (US)

( * ) Notice: Subject to any disclaimer, the term of this patent is extended or adjusted under 35 U.S.C. 154(b) by 150 days.

(21) Appl. No.: 13/367,556

(22) Filed: Feb. 7, 2012

(65) Prior Publication Data

US 2014/0258441 A1 Sep. 11, 2014

Related U.S. Application Data

(60) Provisional application No. 61/540,895, filed on Sep. 29, 2011.

(51) Int. Cl.
| | | |
|---|---|---|
| *G06Q 30/02* | (2012.01) | |
| *H04W 12/06* | (2009.01) | |
| *H04W 12/08* | (2009.01) | |
| *H04L 29/08* | (2006.01) | |
| *H04L 29/06* | (2006.01) | |
| *H04W 84/12* | (2009.01) | |

(52) U.S. Cl.
CPC .......... *H04W 12/06* (2013.01); *H04L 63/0876* (2013.01); *H04L 63/10* (2013.01); *H04L 63/123* (2013.01); *H04L 67/14* (2013.01); *H04L 67/306* (2013.01); *H04W 12/08* (2013.01); *H04W 84/12* (2013.01)

(58) Field of Classification Search
CPC ..................................................... G06Q 30/02
USPC ......................................................... 709/217
See application file for complete search history.

(56) References Cited

U.S. PATENT DOCUMENTS

| | | | |
|---|---|---|---|
| 6,374,300 B2 | 4/2002 | Masters | |
| 6,725,281 B1* | 4/2004 | Zintel et al. | ................. 719/318 |
| 6,810,412 B1 | 10/2004 | Chang | |
| 8,347,384 B1 | 1/2013 | Preston | |
| 2002/0161884 A1 | 10/2002 | Munger | |
| 2006/0291481 A1 | 12/2006 | Kumar | |
| 2007/0094490 A1 | 4/2007 | Lohr | |
| 2007/0097976 A1 | 5/2007 | Wood | |
| 2008/0165964 A1 | 7/2008 | Lewis | |
| 2008/0281606 A1 | 11/2008 | Kitts | |
| 2010/0162399 A1 | 6/2010 | Sheleheda | |
| 2011/0161293 A1* | 6/2011 | Vermeulen et al. | .......... 707/626 |
| 2011/0271289 A1* | 11/2011 | Weiser et al. | ................. 719/317 |

(Continued)

OTHER PUBLICATIONS

Israel L'Heureux and Mark D. Alleman, Response to USPTO Office Action for pending U.S. Appl. No. 13/431,095, response filed at USPTO on Nov. 26, 2013, unpublished.

(Continued)

*Primary Examiner* — Vivek Srivastava
*Assistant Examiner* — Sibte Bukhari
(74) *Attorney, Agent, or Firm* — Michael J. Andri

(57) ABSTRACT

A gateway router supports a plurality of API calls initiated by application programs of client devices of a LAN and/or by network devices of a WAN. The gateway router is positioned at a boundary between the LAN and the WAN. The gateway router may take the form of a wireless local area network (WLAN) router that communicates with the client devices via the WLAN. API calls initiated by application programs operating at the client devices may be received by an operating system of the gateway router via the LAN. The gateway router is configured to perform functions corresponding to the respective API calls.

11 Claims, 14 Drawing Sheets

(56) References Cited

U.S. PATENT DOCUMENTS

| | | |
|---|---|---|
| 2012/0192258 A1 | 7/2012 | Spencer et al. |
| 2013/0005488 A1 | 1/2013 | Evans et al. |
| 2013/0046893 A1 | 2/2013 | Hauser et al. |
| 2013/0275228 A1 | 10/2013 | Milazzo |
| 2014/0025753 A1 | 1/2014 | Gronowski |

OTHER PUBLICATIONS

USPTO Notice of Allowance, Examiner's Search, and Search Information for pending U.S. Appl. No. 13/431,095, notification date Dec. 6, 2013, unpublished.

USPTO Final Office Action, List of References, Examiner's Search, and Search Information for pending U.S. Appl. No. 13/309,505, notification date Jan. 10, 2014, unpublished.

Examiner Search Information for pending U.S. Appl. No. 13/431,095, Feb. 28, 2013, unpublished.

USPTO Office Action for pending U.S. Appl. No. 13/431,095, notification date Feb. 28, 2013, unpublished.

Israel L'Heureux and Mark D. Alleman, Response to USPTO Office Action for pending U.S. Appl. No. 13/431,095, response filed at USPTO on Aug. 26, 2013, unpublished.

Israel L'Heureux and Mark D. Alleman, "Access Control Interfaces for Enhanced Wireless Router", Specification for pending U.S. Appl. No. 13/431,095, filed Mar. 27, 2012, unpublished.

Israel L'Heureux and Mark D. Alleman, "Access Control Interfaces for Enhanced Wireless Router", Drawings for pending U.S. Appl. No. 13/431,095, filed Mar. 27, 2012, unpublished.

Examiner Search Information for pending U.S. Appl. No. 13/309,505, Jun. 24, 2013, unpublished.

USPTO Office Action for pending U.S. Appl. No. 13/309,505, notification date Jun. 24, 2013, unpublished.

Israel L'Heureux and Mark D. Alleman, Response to USPTO Office Action for pending U.S. Appl. No. 13/309,505, response filed at USPTO on Sep. 4, 2013, unpublished.

Israel L'Heureux and Mark D. Alleman, "Gateway Router Supporting Session Hand-Off and Content Sharing Among Clients of a Local Area Network", Specification for pending U.S. Appl. No. 13/309,505, filed Dec. 1, 2011, unpublished.

Israel L'Heureux and Mark D. Alleman, "Gateway Router Supporting Session Hand-Off and Content Sharing Among Clients of a Local Area Network", Drawings for pending U.S. Appl. No. 13/309,505, filed Dec. 1, 2011, unpublished.

Israel L'Heureux, et al., Applicants' Response to Office Action for pending U.S. Appl. No. 13/309,505, Jul. 10, 2014, USPTO, United States.

USPTO, Interview Request and Summary for pending U.S. Appl. No. 13/309,505, Aug. 28, 2014, USPTO, United States.

United States Patent and Trademark Office, Office Action for U.S. Appl. No. 13/631,184, Office Communication, Jun. 3, 2015, 16 pages, United States.

United States Patent and Trademark Office, Search Notes for U.S. Appl. No. 13/631,184, Office Communication, Jun. 3, 2015, 16 pages, United States.

Israel L'Heureux et al., Applicants' Response to Office Action for U.S. Appl. No. 13/631,184, Oct. 5, 2015, 10 pages.

Israel L'Heureux et al., Applicants' Response to Office Action for U.S. Appl. No. 13/309,505, Aug. 28, 2015, 18 pages.

United States Patent and Trademark Office, Office Action for U.S. Appl. No. 13/309,505, Office Communication, Feb. 4, 2015, 16 pages, United States.

United States Patent and Trademark Office, Search Information for U.S. Appl. No. 13/309,505, Office Communication, Feb. 4, 2015, 2 pages, United States.

United States Patent and Trademark Office, Examiner's Search Strategy and Results for U.S. Appl. No. 13/309,505, Office Communication, Feb. 4, 2015, 7 pages, United States.

\* cited by examiner

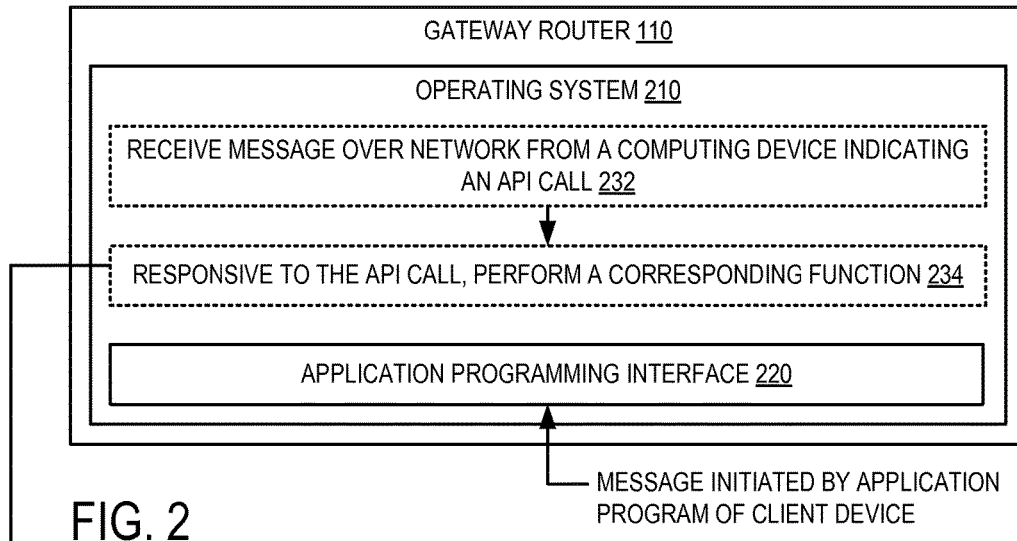
FIG. 2
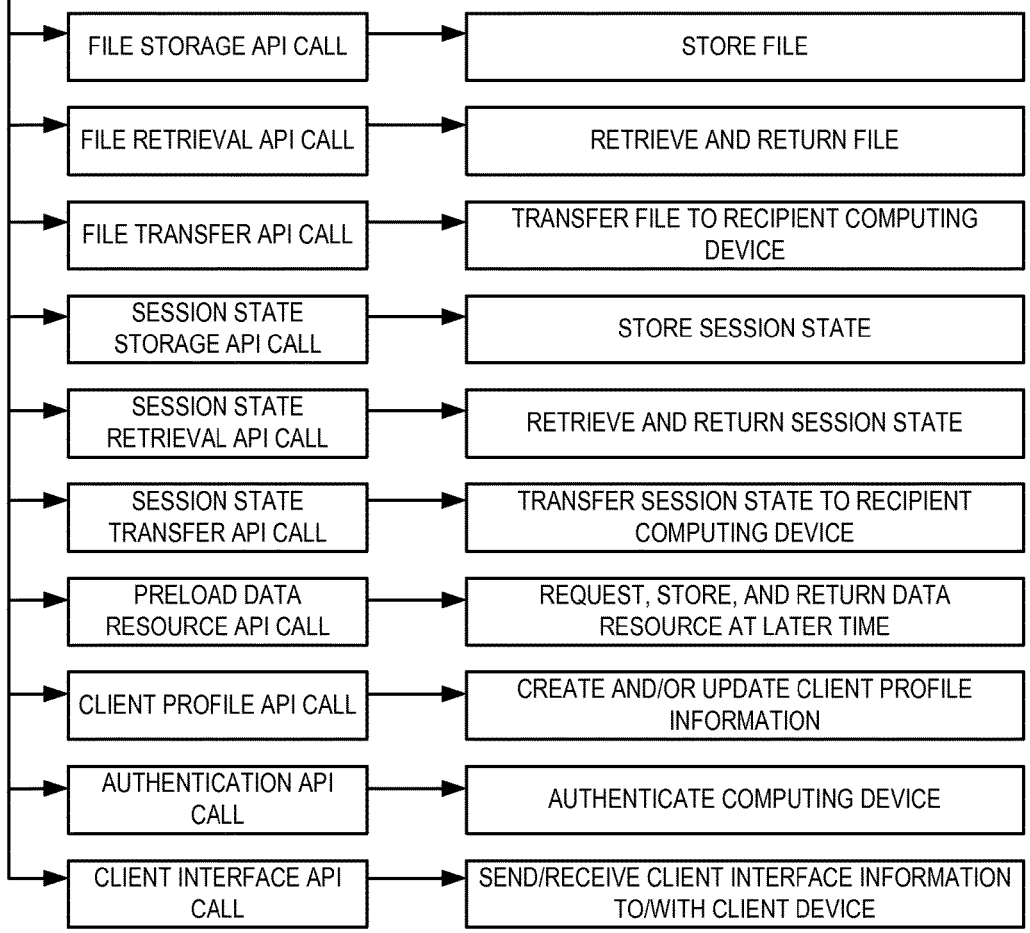

APPLICATION PROGRAMMING INTERFACE FOR ENHANCED WIRELESS LOCAL AREA NETWORK ROUTER

CROSS-REFERENCE TO RELATED APPLICATION

The present application claims priority to U.S. Provisional Patent Application Ser. No. 61/540,895, titled SMART ROUTER, filed Sep. 29, 2011, the entire contents of which are incorporated herein by reference in their entirety for all purposes.

BACKGROUND

On-premises wireless routers provide wireless local area network (WLAN) access to client devices in both home and business environments. These wireless routers are typically connected to a wide area network (WAN) such as the Internet via a high capacity wired or wireless communications link to provide client devices of the WLAN with high-speed access to network resources of the WAN. These wireless routers serve as gateways or access points for multiple client devices to concurrently access wide area networks.

SUMMARY

A WLAN router includes an operating system having an application programming interface (API). The API supports a plurality of API calls directing the WLAN router to perform respective corresponding functions. As one example, the WLAN router receives a first message over the WLAN from a first client device indicating a first API call of the API. The first message is initiated by an application program operating at the first client device. The WLAN router stores a data resource at a storage system of the WLAN router responsive to the first API call. The WLAN router receives a second message over the WLAN indicating a second API call of the API. The second message may be initiated by an application program operating at the first client device or a second client device of the WLAN. The WLAN router sends an instance of the data resource stored at the storage system to a recipient client device over the WLAN responsive to the second API call. The recipient client device may correspond to the first client device or the second client device. Other API calls are also supported by the WLAN router. Accordingly, claimed subject matter is not limited by this summary as other examples may be disclosed by the following written description and associated drawings.

BRIEF DESCRIPTION OF DRAWINGS

FIG. 2 is a schematic diagram depicting an example application programming interface process flow for the gateway router of FIG. 1 according to one disclosed embodiment.

DETAILED DESCRIPTION

Figure 1:
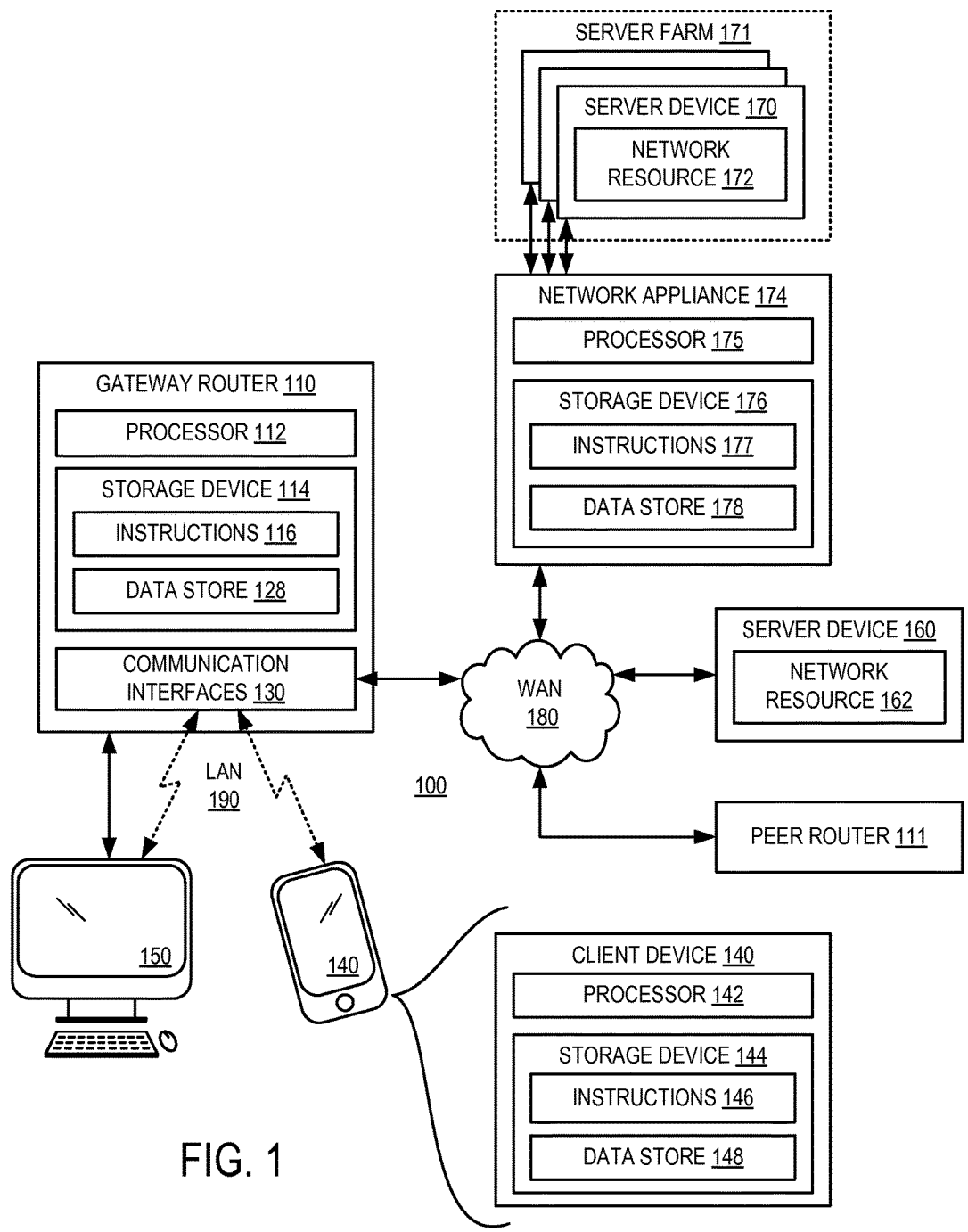
FIG. 1 is a schematic diagram depicting an example computing system according to one disclosed embodiment.

A gateway router is described that supports a plurality of API calls initiated by application programs of client devices of a LAN and/or by network devices of a WAN. The gateway router is positioned at a boundary between the LAN and the WAN. The gateway router may take the form of a wireless local area network (WLAN) router that communicates with the client devices via the WLAN.

API calls initiated by application programs operating at the client devices may be received by an operating system of the gateway router via the LAN. The gateway router is configured to perform functions corresponding to the respective API calls. API calls supported by the gateway router may include any suitable function that may be performed by the gateway router. Non-limiting examples of the API calls supported by the gateway router include:

(1) a file storage API call that directs the gateway router to store a file at a storage system of the gateway router and/or remote network device of the WAN (i.e., cloud storage);

(2) a file retrieval API call that directs the gateway router to retrieve and return a file stored at the storage system of the gateway router and/or cloud storage to the client device;

(3) a file transfer API call that directs the gateway router to transfer a file to another client device of the LAN;

(4) a session state storage API call that directs the gateway router to store a session state of a communications session or a program session of a client device at the storage system of the gateway router or cloud storage;

(5) a session state retrieval API call that directs the gateway router to retrieve and return a session state stored at the storage system to a client device to enable the session to be re-established by the client device;

(6) a session state transfer API call that directs the gateway router to transfer the session state to another client device of the LAN to enable that client device to re-establish the session;

(7) a preload API call that directs the gateway router to request a data resource from a network device over the WAN, store the data resource returned by the network device at a storage system of the gateway router, and return an instance of the data resource to a client device of the LAN at a later time responsive to a request directed by the client device to the gateway router or to the network device for the data resource;

(8) a client profile API call that directs the gateway router to create a client profile and/or update client profile information at the storage system of the gateway router and/or cloud storage;

(9) an authentication API call that directs the gateway router to authenticate a client device with one or more parameters specified by the client device or passively detected by the gateway router over the LAN;

(10) a client interface API call that directs the gateway router to send client interface information to a client device over the LAN enabling presentation of a client interface at the client device for controlling operation of the gateway router; and

(11) a share screen API call that directs the gateway router to initiate a share screen mode between two or more client devices over the LAN.

FIG. 1 is a schematic diagram depicting an example computing system 100 according to one disclosed embodiment. Computing system 100 includes a number of computing devices, such as a gateway router 110, one or more client devices (e.g., client devices 140, 150), and one or more network devices (e.g., server devices 160, 170). Gateway router 110 may be positioned along a communications path between a wide area network (WAN) 180 and a local area network (LAN) 190. Gateway router 110 is depicted providing LAN 190 access for client devices 140 and 150, and positioned at a boundary between LAN 190 and various network devices of WAN 180. Gateway router 110 may be implemented as on-premises equipment to provide LAN access to homes, residences, businesses, or other suitable LAN use environments. In some implementations, gateway router 110 may take the form of a private gateway or access point that is owned and/or operated by an owner or operator of the home, residence, business, or use environment in which the gateway router is deployed, in contrast to some public cellular network base stations.

Gateway router 110 includes a communication interface 130 to support wired and/or wireless communications between client devices of LAN 190 and network devices of WAN 180. Communications interface 130 may include one or more wired and/or wireless transceivers, modems, or other suitable electronic devices to facilitate communications with other computing devices. Gateway router 110 may establish communications sessions with client devices of LAN 190, and may route communications between these client devices and network devices of WAN 180. For example, client devices 140 and 150 may request and receive network resources 162 or 172 from server devices 160 or 170 via gateway router 110.

WAN 180 may, for example, take the form of the Internet or a portion thereof. LAN 190 of gateway router 110 may support wired and/or wireless communications between gateway router 110 and client devices 140 and 150. If supported, wired communications within LAN 190 may include Ethernet, powerline Ethernet, or other suitable form of wired communications. LAN 190 may support communications through any suitable type and/or number of wireless protocol standards. For example, LAN 190 may support one or more of the following standards: Wi-Fi (e.g., 802.11), Wi-MAX (e.g., 802.16), LTE (e.g., 3GPP TS 36), UMTS (e.g., 3GPP TS 25), CDMA, Bluetooth, or other suitable wireless protocol.

Gateway router 110 may include a processor 112 to execute instructions 116. Instructions 116 may be held in a storage device 114. Storage device 114 may include or take the form of non-volatile memory. For example, storage device 114 may include or take the form of a hard drive, flash memory device, or other suitable non-volatile storage device. Gateway router 110 may further include volatile memory, which may be used in combination with non-volatile memory of storage device 114 by processor 112 to execute instructions 116.

Instructions 116 may include or take the form of software and/or firmware. For example, instructions 116 may form part of an operating system of gateway router 110, an application program, a software component such as a plug-in, or other suitable instruction set, or combination thereof. An operating system of gateway router 110 may include an application programming interface (API) that supports a plurality of API calls described in greater detail with respect to FIG. 2. In some implementations, functionality provided by gateway router 110 may be supported, at least in part, by associated (e.g., paired) instructions (e.g., software or firmware) executed at a client device of LAN 190 and/or associated instructions (e.g., software or firmware) executed at a network device of WAN 180 (e.g., server device 160 or network appliance 174). As one example, an operating system or application program of client device 140 of LAN 190 may operate in combination with software of gateway router 110. For example, an application program operating at client device 140 may initiate API calls that may be received over LAN 190 by an operating system of gateway router 110 via an application programming interface. As another example, software of a peer gateway router (e.g., peer gateway router 111) and/or network server device (e.g., server device 160) of WAN 180 may operate in combination with software of gateway router 110. For example, these network devices of WAN 180 may initiate API calls that may be received by an operating system of gateway router 110 over the WAN via an application programming interface.

Storage device 114 of gateway router 110 may include a data store 128. Information may be stored at and/or retrieved from data store 128 by processor 112. Such information may include client identity information or other suitable data resources. An example client identity is described in greater detail with reference to FIG. 5. In contrast to traditional data caches, storage device 114 of gateway router 110 may additionally or alternatively contain short term information such as session data, and/or permanent or long term information such as profile information and data resources or objects such as data dictionaries, or renderable content such as chunks of movie data or other media content. Accordingly, gateway router 110 may include volatile storage such as RAM, non-volatile storage such as FLASH memory, a hard drive, etc.

Client devices 140 and 150 may take the form of a personal computer, mobile computing device, mobile communications device (e.g., Internet enabled phone), television set-top box, or other suitable electronic device. As one example, a client device, such as client device 140, may include a processor 142 to execute instructions 146 held in storage device 144. Instructions 146 may include or take the form of software and/or firmware. For example, instructions 146 may form part of an operating system of client device 140, an application program, a software component such as a plug-in, or other suitable instruction set, or combination thereof. In some implementations, instructions 146 of client device 140 may be configured to operate in coordination with or may be paired with instructions 116 of gateway router 110. Storage device 144 may include a data store 148. Information may be stored at and/or retrieved from data store 148 by processor 142. Some client devices, such as client device 140, may be further configured for WAN access without traversing gateway router 110. As one example, client device 140 may take the form of a mobile communications device (e.g., an Internet enabled phone) that further supports wireless connectivity via a mobile broadband technology such as, for example, 3G or 4G.

Some network devices, such as server device 170, may be one of a plurality of server devices of a server farm 171. Another network device, such as network appliance 174, may be positioned along a communications path between gateway router 110 and one or more server devices of server farm 171. Network appliance 174 may take the form of a load balancer, application delivery controller, or other suitable network device. Network appliance 174 may include a processor 175 to execute instructions 177 held in storage device 176. Instructions 177 may include or take the form of software and/or firmware. For example, instructions 177 may form part of an operating system of network appliance 174, an application program, a software component such as a plug-in, or other suitable instruction set, or combination thereof. Instructions 177 of network appliance 174 may be configured to operate in coordination with or may be paired with instructions 116 of gateway router 110. Storage device 176 may include a data store 178. Information may be stored at and/or retrieved from data store 178 by processor 175.

Computing system 100 may include other gateway routers, such as peer gateway router 111. In some implementations, peer gateway router 111 may be identical to previously described gateway router 110. For example, peer gateway router 110 may provide LAN access for one or more client devices. Peer gateway router 111 may be a nearby/local gateway router for the same or nearby premises as gateway router 110, and may provide LAN 190 in combination with gateway router 110. In this implementation, peer gateway router 111 and gateway router 110 may communicate via LAN 190. Alternatively, peer gateway router 111 may be located at a different premises that is remote from gateway router 110 and may provide a separate LAN to respective client device. In this implementation, peer gateway router 111 may communicate with gateway router 110 via WAN 180.

FIG. 2 is a schematic diagram depicting an example application programming interface process flow for the gateway router of FIG. 1 according to one disclosed embodiment. In FIG. 2, gateway router 110 includes an operating system 210 having an application programming interface (API) 220. Operating system 210 may be defined by or form part of previously described instructions 116 of FIG. 1.

In FIG. 2, gateway router 110 receives a message at operating system 210 via API 220 as indicated at 232. The message may be transmitted over a network from a computing device. For example, the message may be initiated by an application program operating at the computing device. As one example, the network may include a local area network (e.g., LAN 190) and the computing device may take the form of a client device of the LAN. As another example, the network may include a wide area network (WAN 180) and the computing device may take the form of a network device such as server device, peer router, or network appliance. In some implementations, operating system 210 may include a LAN-side API for client devices of the LAN and a WAN-side API for network devices of the WAN.

API 220 may support a plurality of API calls. The message received by the operating system may indicate an API call with one or more stated parameters. Responsive to the API call, operating system 212 may perform a corresponding function as indicated at 234.

Non-limiting examples API calls supported by API 214 may include: (1) A file storage API call that directs the gateway router to store a file at a storage system of the gateway router and/or remote network device of the WAN (i.e., cloud storage); (2) A file retrieval API call that directs the gateway router to retrieve and return a file stored at the storage system of the gateway router and/or cloud storage to the client device; (3) A file transfer API call that directs the gateway router to transfer a file to another client device of the LAN; (4) A session state storage API call that directs the gateway router to store a session state of a communications session or a program session of a client device at the storage system of the gateway router or cloud storage; (5) A session state retrieval API call that directs the gateway router to retrieve and return a session state stored at the storage system to a client device to enable the session to be re-established by the client device; (6) A session state transfer API call that directs the gateway router to transfer the session state to another client device of the LAN to enable that client device to re-establish the session; (7) A preload API call that directs the gateway router to request a data resource from a network device over the WAN, store the data resource returned by the network device at a storage system of the gateway router, and return an instance of the data resource to a client device of the LAN at a later time responsive to a request directed by the client device to the network device for the data resource; (8) A client profile API call that directs the gateway router to create and/or update client profile information at the storage system of the gateway router and/or cloud storage; (9) An authentication API call that directs the gateway router to authenticate a client device with one or more parameters specified by the client device or passively detected by the gateway router over the LAN; (10) A client interface API call that directs the gateway router to send client interface information to a client device over the LAN enabling presentation of a client interface at the client device for controlling operation of the gateway router.

Figure 3:
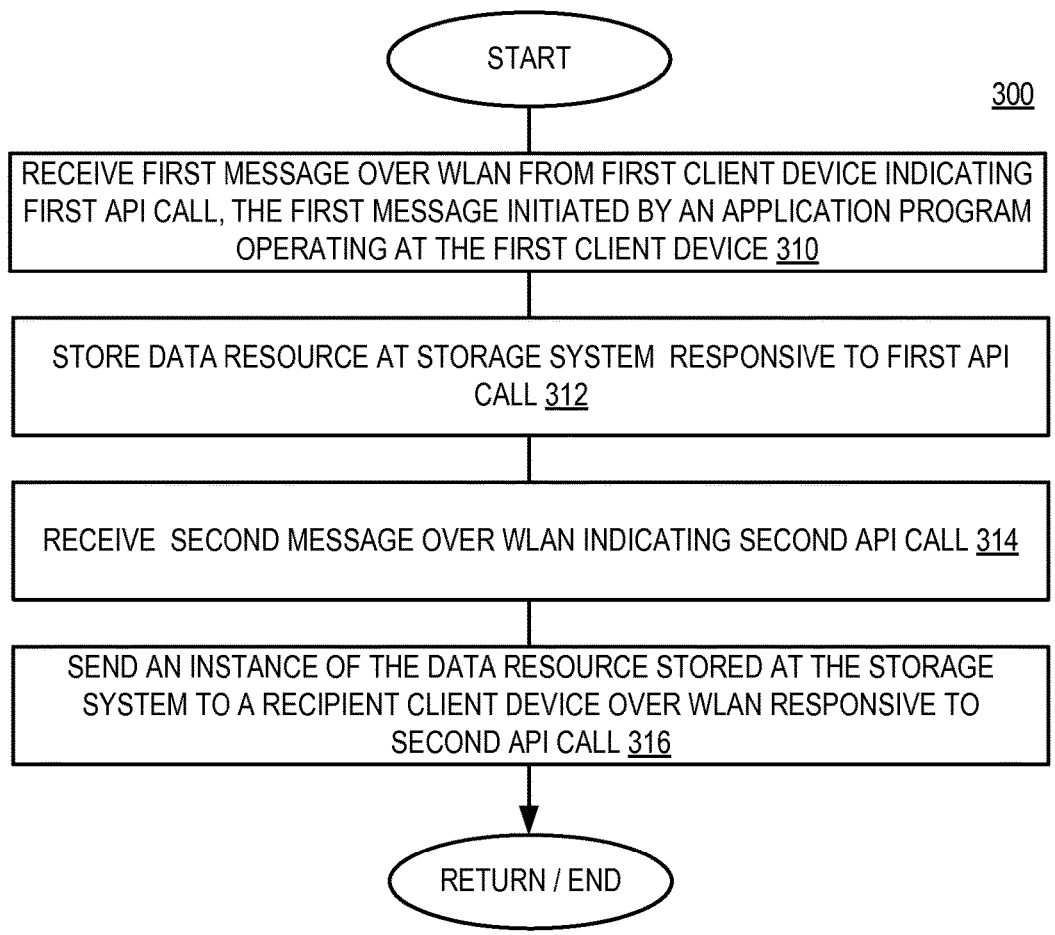
FIG. 3 is a flow diagram depicting an example method for a gateway router according to one disclosed embodiment in which a plurality of API calls are received by the gateway router.

API 214 may support other suitable API calls in addition to or as an alternative to the above non-limiting examples. Multiple API calls may be used in combination by one or more client devices of the LAN and/or network devices of the WAN. FIG. 3 is a flow diagram depicting an example method 300 for a gateway router according to one disclosed embodiment in which a plurality of API calls are received by the gateway router. As one example, the gateway router may take the form of a wireless local area network (WLAN) router. The WLAN router may include an operating system having an application programming interface (API) supporting a plurality of API calls.

At 310, a first message may be received over the WLAN from a first client device indicating a first API call of the API. The first message may be initiated by an application program operating at the first client device. At 312, a data resource may be stored at the storage system responsive to the first API call (e.g., a file storage API call or a session state storage API call). As one example, the WLAN router may store the data resource at the storage system in a profile associated with the first client device or a user of the first client device responsive to the first API call.

As one example, the data resource may include state information for a network communications session (i.e., session state) between the first client device and a network device of a wide area network (WAN). For example, the WLAN router may obtain the state information from network communications passing through the WLAN router between the first client device and the network device during the network communications session. Accordingly, the data resource may enable an application program operating at a recipient client device to re-establish the network communications session with the network device of the wide area network. As another example, the data resource may include one or more of: an electronic file, or permissions information or preference information to be associated with a profile stored at the WLAN router. In some examples, the first message received at 310 may indicate the data resource or may include the data resource or a portion thereof.

At 314, a second message may be received over the WLAN indicating a second API call of the API. The second API call may be initiated by the first client device, another client device of the WLAN, or a network device of the WAN. At 316, an instance of the data resource stored at the storage system may be sent to a recipient client device over the WLAN responsive to the second API call. The recipient client device may correspond to the first client device or another client device. The recipient client device may receive the data resource sent over the WLAN.

In some examples, the second message indicating the second API call may be received from the first client device that previously initiated the first API call. For example, the second message may be initiated by the same application program or a different application program operating at the first client device. The recipient client device may correspond to a second client device of the WLAN, and the second message received from the first client device may indicate the identity of the recipient client device as being the second client device of the WLAN. For example, the first client device may direct the WLAN router to send a data resource previously stored at the WLAN router to the second client device. As another example, the recipient client device may correspond to the first client device from which the second message was received. For example, the first client device may retrieve a data resource previously stored at the WLAN router by or at the direction of the first client device.

In some examples, the data resource may be one of a plurality of data resources stored in a profile associated with the first client device. The second API call may correspond to a file or session state transfer API call (e.g., a synchronization function or hand-off function) for synchronizing or handing-off one or more of the plurality of data resources between the first client device and the recipient client device. The WLAN router may send an instance of at least some of the plurality of data resources stored in the profile associated with the first client device to the recipient client device responsive to the second API call to synchronize or hand-off one or more of the plurality of data resources between the first client device and the recipient client device.

As previously described with reference to FIG. 2, other API calls may be supported by the WLAN router. For example, the WLAN router may receive a third message over the WLAN from the recipient client device (e.g., the first client device or the second client device) indicating a third API call of the API. Again, the third message may be initiated by an application program of the recipient client device. Responsive to the third API call, the WLAN router may authenticate the recipient client device with authentication information included in the third message before sending an instance of the data resource to the recipient client device at 316, for example. As another example, the WLAN router may receive a third message over the WLAN from the first client device indicating a third API call of the API. The third message may be initiated by an application program of the first client device. Responsive to the third API call, the WLAN router may authenticate the first client device with authentication information included in the third message before storing the data resource at the storage system at 312, for example. As yet another example, the WLAN router may receive a third message indicating a third API call of the API from either a network device over the WAN or from the first client device over the WLAN. The WLAN router may be configured to send an instance of the data resource stored at the storage system to the network device over the wide area network responsive the third API call (e.g., to provide cloud storage of the data resource).

As previously described with reference to FIG. 2, the WLAN router may support preloading of data resources. Continuing with the example of method 300, a second data resource may be received by the WLAN router from a network device over the WAN. The second data resource may be predicted by the WLAN router and/or by the network device to be requested by the first client device at a later time. The second data resource may be stored at the storage system of the WLAN router. The WLAN router may receive a third message over the WLAN from the first client device indicating a third API call of the API. The third message may be initiated by an application program operating at the first client device, and may be directed at the network device. However, the WLAN router may intercept the third message and may send an instance of the second data resource stored at the storage system to the first client device over the WLAN responsive to receiving the third message.

Figure 4:
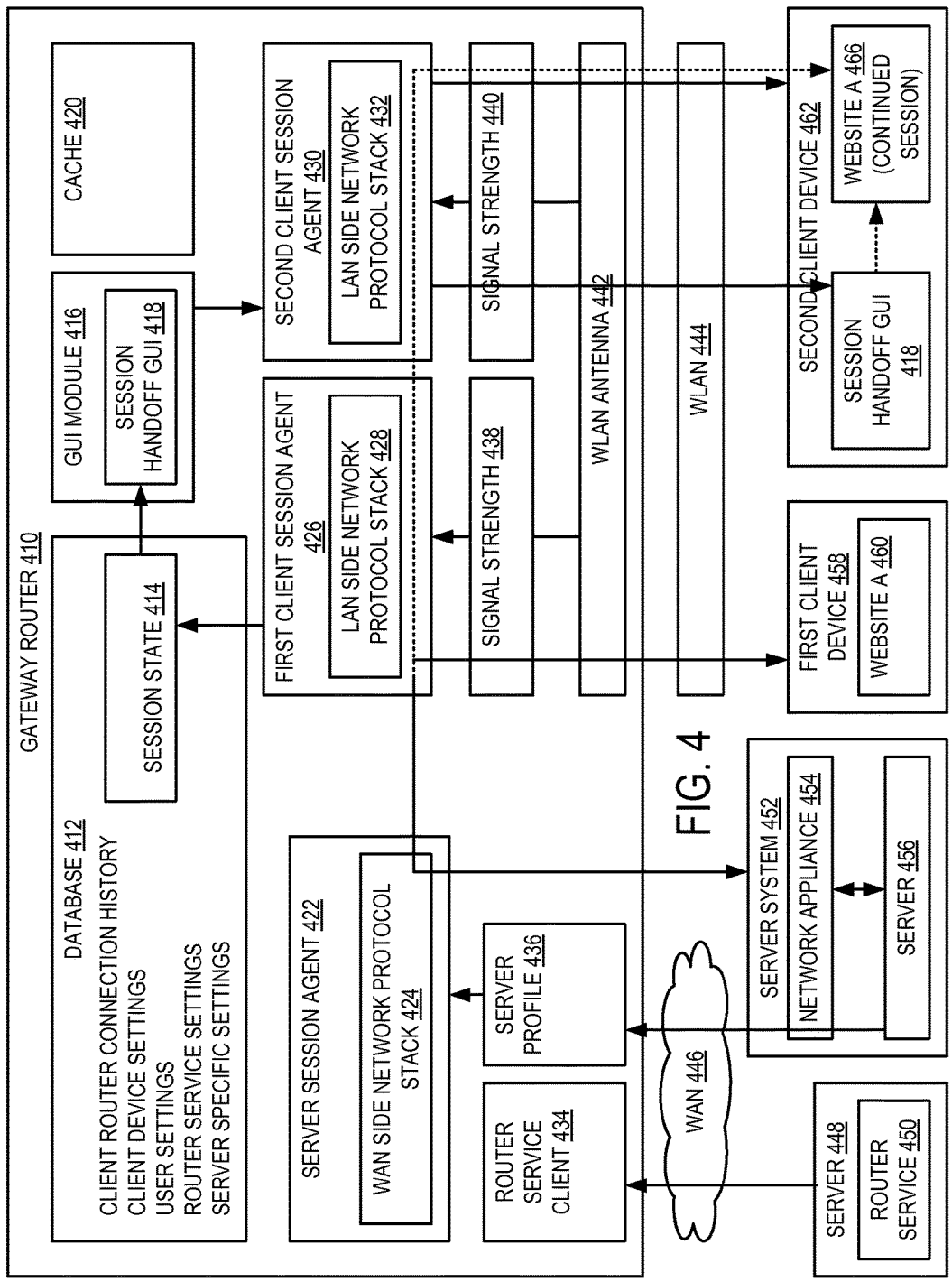
FIG. 4 is a schematic diagram depicting additional aspects of a gateway router, including an application programming interface according to one disclosed embodiment.

FIG. 4 is a schematic diagram depicting additional aspects of a gateway router 410, including an application programming interface according to one disclosed embodiment. Gateway router 410 of FIG. 4 may correspond to previously described gateway router 110 of FIGS. 1 and 2, as FIG. 4 provides a non-limiting use scenario of computing system 100. In FIG. 4, an application program (e.g., a web browser application) and/or operating system component on each client device communicates with an API on the gateway router, such as with a file storage API call, a session state transfer API call (e.g., session state handoff), a session state storage API call, and an authentication API call (e.g., for user login and/or device authentication), or other suitable API call.

As one example, first client device 458 may establish a communications session with a website (e.g., website A 460) hosted at a network device (e.g., server system 452 or server device 448) of a WAN 446. First client device 458 may receive aspects of the website (e.g., one or more data resources) via gateway router 410 over WLAN 444. In some examples, a first client session agent 426 supporting a LAN side network protocol stack may store session state information at database 412 as session state 414. Session state 414 may be accessed by a second client device 462 via a session handoff GUI 418 of a GUI module 416. Session handoff GUI 418 is an example of a client interface for controlling the gateway router. Second client device 462 may receive aspects of website A 466 to re-establish the communication session initiated by first client device 458. In some examples, a second client session agent 430 supporting a LAN side network protocol stack 432 may facilitate delivery of session handoff GUI 418 and a continued session of website A 466 to second client device 462.

A WLAN antenna 442 may provide indications of signal strength 438 and 440 for first and second client devices to agents 428 and 432. An indication of WLAN signal strength may be used by the gateway router to control transmitter power, receiver power, and error correction of wireless signals over WLAN 444. Signal strength may also be used to identify whether a client device is within range of the WLAN, and may serve as an additional form of authentication to confirm whether a client device is actually present at the WLAN before enabling the client device to access information stored at the gateway router.

Figure 5:
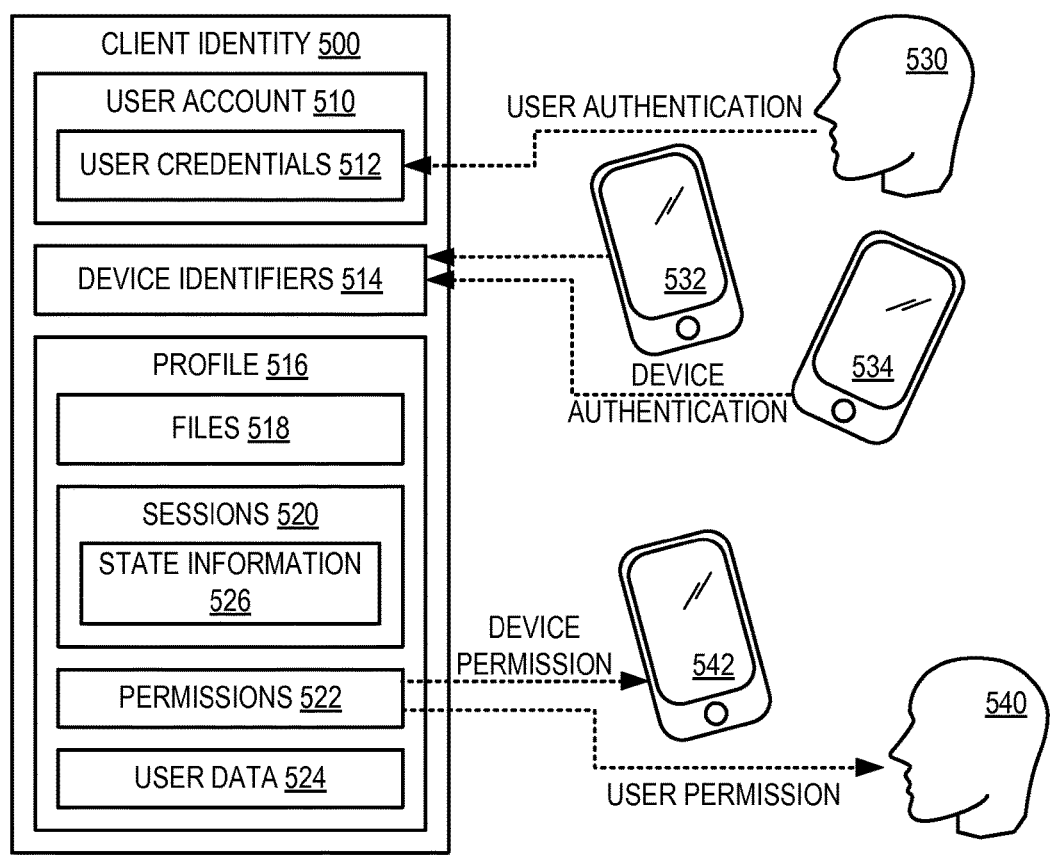
FIG. 5 is a schematic diagram depicting an example client identity according to one disclosed embodiment.

Database 412 of gateway router 410 may include client router connection history, client device settings, user settings, router service settings, and server specific settings, among other aspects of client identity information described with reference to FIG. 5. Gateway router 410 may further include a cache 420 for shorter term storage of information as compared to database 412.

A server 448 of WAN 446 may communicate with gateway router 410 via a router service client 434. Server 448 may take the form of a peer WLAN router and may include a router service 450. A server system 452 including a network appliance 454 and one or more servers 456 may communicate with gateway router 410 via a server session agent 422 having a WAN side network protocol stack 424. Server system 452 may access and/or update information stored in a server profile 436. Server system 452 may also receive and respond to requests initiated by first client device 458 and/or second client device 462 via server session agent 422. Communications passing between server system 452 (or server 448) and client devices 458 and/or 466 may include information that may be stored at database 412 as session state 414.

A gateway router, such as gateway routers 110 and 410 may use a client identity to define an association of information that includes a profile, a user account representing a human user, and one or more device identifiers representing respective client devices. FIG. 5 is a schematic diagram depicting an example client identity 500 according to one disclosed embodiment. Client identity 500 or portions thereof may be stored at a data store of a gateway router (e.g., data store 128 of gateway router 110), at a data store of a network service accessible to the gateway router via a communications network (e.g., WAN 180), and/or at a data store of a client device (e.g., data store 148 of client device 140).

Client identity 500 may include a user account 510 having user credentials 512. User credentials 512 may be used by the gateway router to authenticate user account 510 (e.g., via a log-in process). Client identity 500 may include one or more device identifiers 514 corresponding to one or more respective client devices. Device identifiers 514 may include any suitable identifier that enables the gateway router to distinguish client devices from each other. As one example, a device identifier may include a MAC address of a client device. As another example, a device identifier may include or may be based on an identifier of an application program or operating system of a client device. In some implementations, the gateway router may enable users to name client devices, for example, by associating a user assigned name with a device identifier. Because client identity 500 may include two or more device identifiers corresponding to two or more client devices, an individual user may be associated with two or more client devices by client identity 500. Conversely, an individual client device may be associated to two or more users, for example, by the inclusion of a device identifier of the client device in two or more different client identities.

Client identity 500 may include a profile 516. Profile 516 may include or otherwise indicate files 518, sessions 520, permissions 522, and/or user data 524. Files 518 may include one or more of the following: (1) files uploaded to the gateway router by client identity 500, (2) files sent to client identity 500 by another client device or user account of a different client identity, (3) an index of files stored at each of the client devices corresponding to device identifiers 514. User data 524 may include biographical information (e.g., user profile name, user profile picture, user preferences, etc.) and/or other suitable information for a user represented by user account 510.

Sessions 520 may include state information 526 for network communications sessions and/or application program sessions. The state information 526 may be used by the gateway router and/or a client device to continue an existing session at the client device. State information 526 may include, for example, a browser cookie or a web cookie. However, other forms of state information may be supported, including state information for application programs.

Permissions 522 may include one or more permission indicators for client identities, user accounts, device identifiers, etc. Permissions 522 may be referenced by the gateway router to determine whether a particular user represented by a user account or client device represented by a device identity is able to view or access information of profile 516, such as files 518, sessions 520, user data 524, etc. Accordingly, permissions 522 may be defined at the device level, user level, or client identity level which, as previously described, may include an association of a user with one or more client devices. Permissions 522 may also specify whether access has been granted individual data resources such as a particular file of files 518, a particular session of sessions 520, or particular user data of user data 524. As one example, a user 530 represented by user account 510 may permit another user 540 represented by a different client identity to view or access files 518. As another example, user 530 may permit any user to view or access sessions 520 via a particular client device, such as client device 542.

A user may register a user account or a particular client device at the gateway router to create a client identity. FIG. 5 depicts a use scenario where user 530 registers or otherwise creates user account 510 at the gateway router in which user 530 is represented by user credentials 512. User credentials 512 may be used by first user 530 across any computing platform to access information in client identity 500 or services provided by the gateway router. User 530 may also own or operate client devices 532 and 534. Client devices 532 and 534 may be registered with the gateway router in which client devices 532 and 534 are represented by respective device identifiers 514. User 530 may share content of profile 516 between client devices 532 and 534 via the gateway router. User 530 may additionally share the content of profile 516 with other client devices through which first user 530 has provided user credentials 512 to the gateway router.

Information stored in profile 516 such as state information 526 and files 518 may also be shared with user 540 via permissions 522. For example, user 530 may grant permission to user 540 associated with client identity 500 via permissions 522 to share session state and/or files with client devices through which user 540 has been authenticated by the gateway router. For example, user 540 may access session state and/or files of profile 516 from client device 532 owned by first user 530, or from client device 542 that is owned by another user. First user 530 may also grant permission to a client device 542 associated with client identity 500 via permissions 522 to share session state and/or files with any user of client device 542.

Figure 6:
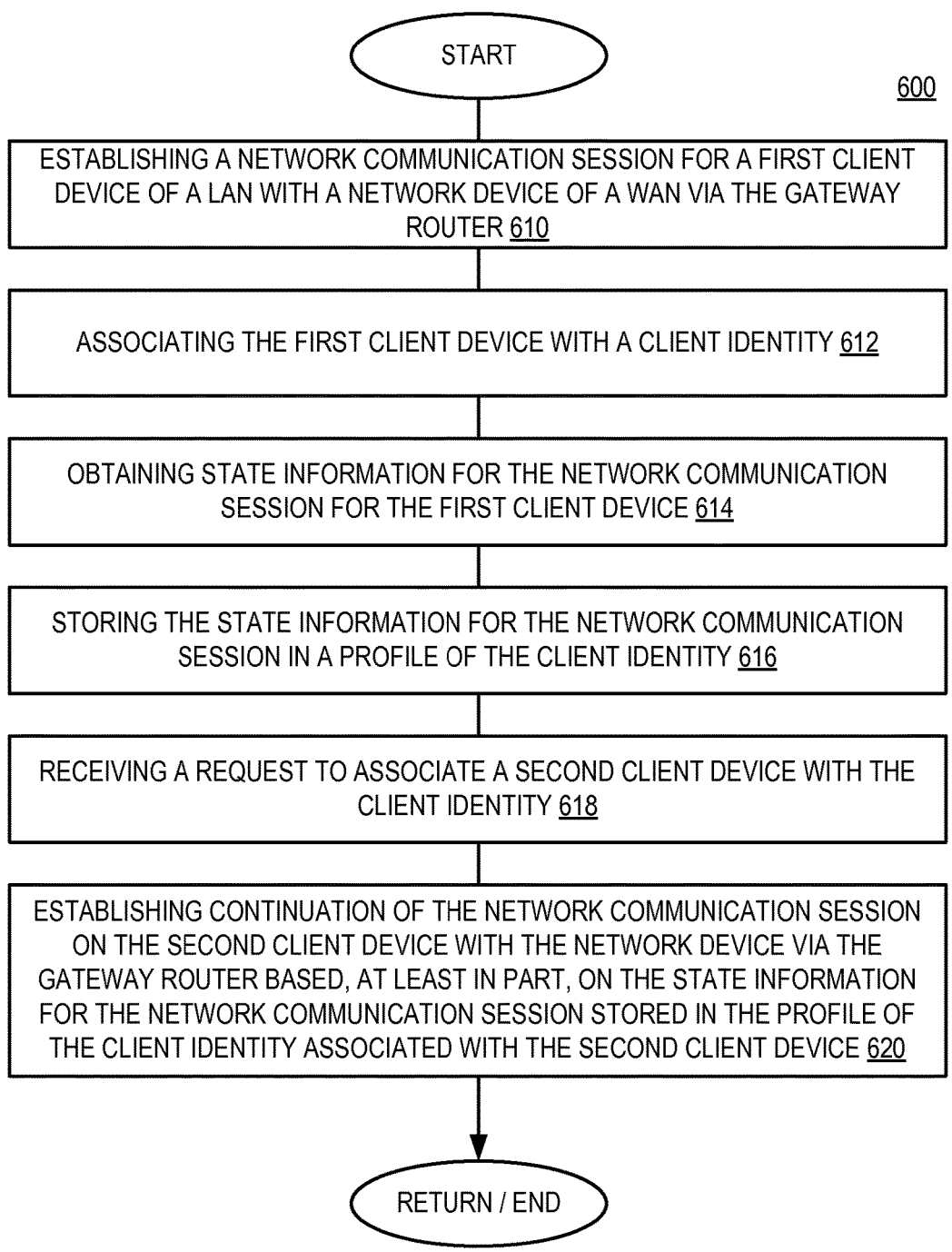
FIG. 6 is a flow diagram depicting an example method for a gateway router in which a network communications session is continued from a first client device to a second client device according to one disclosed embodiment.

FIG. 6 is a flow diagram depicting an example method 600 for a gateway router according to one disclosed embodiment. Method 600 may be performed to achieve a session hand-off between two or more client devices of a LAN via the gateway router. A session hand-off is one example of a session state transfer that may be initiated by a client device by sending an API call to the gateway router. The session hand-off may include a network communications session or an application program session. As one example, method 600 may be performed by previously described gateway router 110 of FIG. 1.

At 610, the method may include establishing a network communications session for a first client device of a LAN with a network device of a WAN via the gateway router. As one example, the network communications session may include communications between software components at the transport layer, which is Layer 4 according to the Open Systems Interconnection (OSI) model. The network communications session may alternatively include an application program session at the application layer, or Layer 7 in the OSI model. Alternatively, other the network communications session may be at another layer, such as the network layer, or may be a combination of a network communications session and an application program session.

At 612, the method may include associating the first client device with a client identity. As previously described, the first client device may be associated with a client identity via a device identifier or by a user account of a user operating the first client device. For example, the client identity may include a collection of device identities corresponding to respective client devices. The collection may include a first device identifier defined, at least in part, by an identifier of the first client device, and a second device identifier defined, at least in part, by an identifier of a second client device.

As one example, the first client device may be associated with the client identity by storing a device identifier received from the first client device with the client identity at a storage device of the gateway router. As another example, the first client device may be associated with the client identity by sending an identifier received from the first client device to a network service accessible to the gateway router via the wide area network. The network service may be configured to store the identifier with the client identity at a remote storage device accessible to the network service.

Prior to or during the process of establishing a network communications session, a user may actively register the client identity with the gateway router (or a network service accessible to the gateway router via the WAN) by providing a device identifier of the first client device to the gateway router and/or by creating a user account at the gateway router that is portable across different client devices. In some implementations, the gateway router may register or passively detect the client identity by detecting a device identifier of the first client device and/or by passively detecting a user account of the user without requiring that the user actively register with the gateway router. As one example, an operating system of a client device may require that a user log-in to a user account of the operating system. User credentials provided by the user for logging-in to the user account of the operating system may be authenticated by the client device, and an indication of the authentication may be sent to the gateway router to also authenticate the user at the gateway router.

At 614, the method may include obtaining state information for the network communications session for the first client device. As one example, the state information may be obtained at an application layer (Layer 7) of a network communications session in the OSI model. For example, the gateway router may obtain and store browser cookies or web cookies sent between the client device and a network device of the WAN. As another example, application programs at the client device may report their state to the gateway router via an application programming interface (API).

In some implementations, the state information for the network communications session may be obtained by the gateway router passively monitoring communications between the first client device and a network device of the WAN without terminating the communications. In some implementations, the state information for the network communications session may be obtained by the gateway router serving as a proxy for communications between the first client device and a network device of the WAN. In this implementation, the gateway router may terminate connections for communications between clients and the network device of the WAN.

At 616, the method may include storing the state information for the network communications session in a profile of the client identity. As one example, the state information may be stored in the profile at a storage device of the gateway router. Additionally or alternatively, the state information may be stored in the profile of the client identity by the gateway router sending the state information to a network service accessible to the gateway router via the WAN. The network service may be configured to store the state information at a remote storage device accessible to the network service. This approach may be referred to as "cloud" based storage.

At 618, the method may include receiving a request to associate a second client device with the client identity. In some implementations, the request to associate the second client device with the client identity may be received from the first client device. As one example, the request may take the form of a permission for the second client device to access the state information for the client identity. As another example, the request may take the form of a request to add or associate a device identifier of the second client device to the client identity. The gateway server may associate the second client device with the client identity responsive to the request.

In some implementations, the request to associate the second client device with the client identity may be received from the second client device. The gateway router may be configured to associate the second client device with the client identity based on the permissions set at the client identity. Alternatively, the gateway router may be configured to forward the request to the first client device responsive to receiving the request from the second client device. The gateway router may receive a response (e.g., as a permission) from the first client device confirming or denying the forwarded request. The gateway router may be configured to associate the second client device with the client identity if the response from the first client device confirms the forwarded request, and may be configured to deny association of the second client device with the client identity if the response from the first client device denies the forwarded request.

As yet another example, the request to associate the second client device with the client identity may be received from the second client device as user credentials. The gateway router may be configured to authenticate the user credentials of the request received from the second client device against user credentials of a user account of the client identity or of a user account permitted to access the profile by permissions. The gateway server may be configured to associate the second client device with the client identity if the user credentials are authenticated against the user credentials of the client identity or of a user account of the permissions, and may be configured to deny association of the second client device with the client identity if the user credentials are not authenticated against the user credentials of the client identity or of the permissions.

The second client device may be associated with the client identity using a similar approach described with respect to the first client device. As one example, the second client device may be associated with the client identity by storing a device identifier received from the second client device with the client identity at a storage device of the gateway router. As another example, the second client device may be associated with the client identity by sending an identifier received from the second client device to a network service accessible to the gateway router via the wide area network. The network service may be configured to store the identifier with the client identity at a remote storage device accessible to the network service.

At 620, the method may include establishing continuation of the network communications session on the second client device with the network device of the WAN via the gateway router based, at least in part, on the state information for the network communications session stored in the profile of the client identity associated with the second client device. For example, the state information may include a browser cookie or web cookie, or other suitable data resource from which session state may be identified.

As previously described, multiple devices owned or controlled by a user of the LAN may be registered with the gateway router. When a user uses a browser program of a first client, the state information (e.g., browser session state and cookies) for that user are saved at the gateway router. If, for example, the user discontinues or sets down a first client device with a set of browser windows open in multiple tabs, the state of those tabs may be saved at the gateway router. When the user connects to the gateway router with a second client device and launches the browser, the gateway router communicates the same tabs to the second client device, and coordinates cookie proxying so that the cookies are transmitted to the second device. Thus, a user browsing a webpage for products on a first client device wouldn't necessarily be required to re-login with a username and/or password on the second client device in order to purchase the products via the second device. Instead, the user could push a button, browse to the gateway router to pick up, or just be configured to "continue sessions". Some or all of the states of the browser windows may be accessible on any client device. A user watching a broadcast television stream on a first display device wouldn't be required to remember the address/channel when picking up the same stream at a different display device. If the cookies have saved the user's state, the user is enabled by the gateway router to resume at the same place the user left off at via the client second device.

As another example, software applications or application programs operating at client devices may maintain state across the client devices via the gateway router. While the applications may not necessarily speak HTTP or other specified communications protocol, the applications may access APIs on the gateway router that enables different client devices to report their state to the gateway router. The applications may access the state of other client devices. A collection of such APIs in a gateway router may provide an operating system for a home or business, where each client device may be a registered, trusted device, used by an authorized user, and may be integrated with other client devices of the user or associated with each other via the gateway router. A seamless user experience may be achieved online and in media consumption across client devices even with the reality of device proliferation. One example of such an API of the gateway router is described with reference to FIGS. 2-4.

Figure 7:
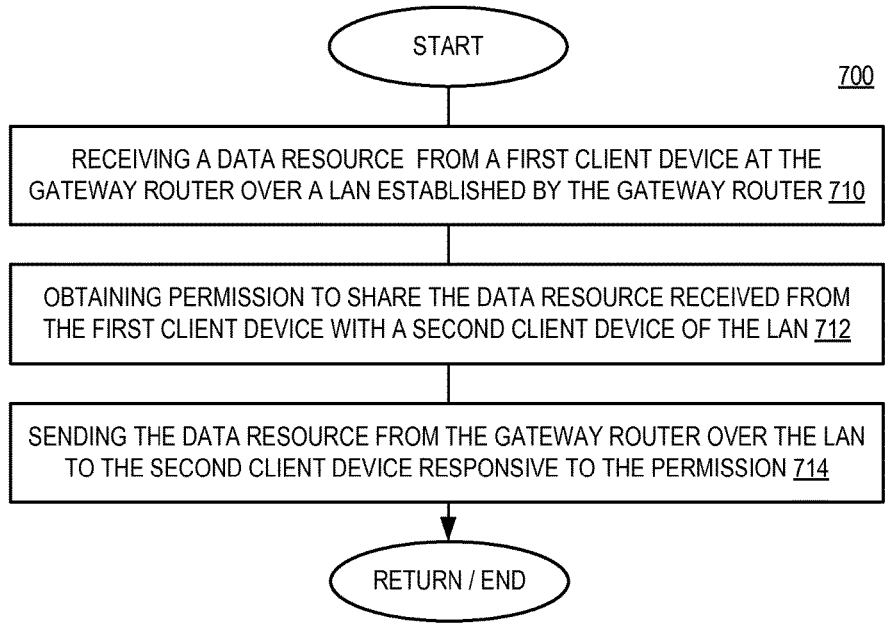
FIG. 7 is a flow diagram depicting an example method for a gateway router in which a data resource at a first client device is shared with a second client device according to one disclosed embodiment.

FIG. 7 is a flow diagram depicting an example method 700 for a gateway router according to one disclosed embodiment. Method 700 may be performed to achieve a data transfer between two or more client devices of a LAN via the gateway router. A data transfer is one example of a file transfer that may be initiated by a client device by sending an API call to the gateway router. As one example, method 700 may be performed by previously described gateway router 110 of FIG. 1.

At 710, the method may include receiving a data resource from a first client device at the gateway router over a local area network established by the gateway router. A data resource may include a file, a hyperlink, a URL or URI, an application program or portion thereof, application session state information, network communications session state information, etc.

At 712, the method may include obtaining permission to share the data resource received from the first client device with a second client device of the LAN. In some implementations, the permission may be obtained from the first client device or from a client identity stored at the gateway router with which the first client device is associated. For example, a request for the data resource may be received at the gateway router from the second client device. The gateway router may forward the request to the first client device, and receive the permission from the first client device as a response to the forwarded request.

In some implementations, the permission may be obtained from the second client device or from the client identity stored at the gateway router with which both the first and the second client device is associated. For example, the permission may be received or authenticated at the gateway router from the second client device in the form of user credentials. The gateway router may authenticate the user credentials against access control information for the data resource stored in a client identity at the gateway router.

In some implementations, the data resource (e.g., file) may be stored in or associated with a profile of a client identity at a storage device of the gateway router. The profile may correspond to a profile associated with the second client device or the first client device (e.g., in a scenario involving a transfer between different client identities), or both the first and second client devices (e.g., in a scenario involving a transfer between client devices within the same client identity).

At 714, the method may include sending the data resource from the gateway router over the LAN to the second client device responsive to the permission. If permitted by permissions set by a client identity associated with the first client device, the gateway router sends the data resource from the gateway router to the second client device by retrieving the data resource from a storage device of the gateway router responsive to a request received from the second client device for the data resource. As one example, the request received from the second client device may include a request to access the contents of an inbox or other data repository.

Figure 8:
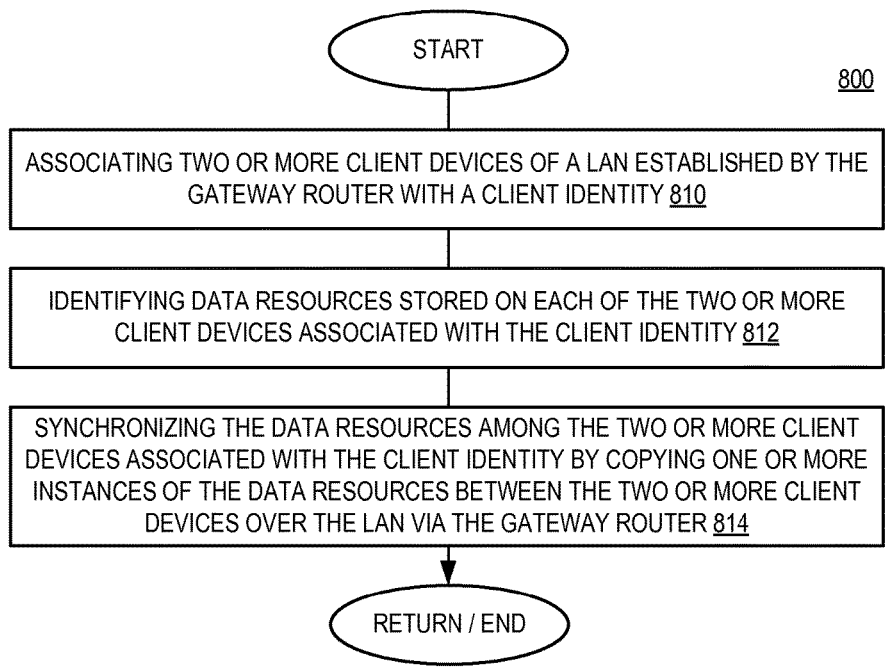
FIG. 8 is a flow diagram depicting an example method for a gateway router in which data resources are synchronized among multiple client devices according to one disclosed embodiment.

FIG. 8 is a flow diagram depicting an example method 800 for a gateway router according to one disclosed embodiment. Method 800 may be performed to synchronize content among two or more client devices of a LAN via the gateway router. Synchronization is another example of a file transfer that may be initiated by a client device by sending an API call to the gateway router. As one example, method 800 may be performed by previously described gateway router 110 of FIG. 1.

In some implementations, the gateway router may enable data syncing between client devices sharing a profile of a client identity. For example, a first client device may belong to a user, and may have a number of applications, media content, and session state information stored thereon. The user may purchase or otherwise acquire a second client device, and may then configure the second client device with the applications, media content, and session state information of the first client device via the gateway router.

At 810, the method may include associating two or more client devices of a LAN established by the gateway router with a client identity. As previously described, the two or more client devices may be associated with a client identity as permissions to access aspects of the profile of the client identity or as members of the client identity (e.g., owned by the same user). At 812, the method may include identifying data resources stored on each of the two or more client devices associated with the client identity. For example, the gateway router may poll client devices of the LAN to identify data resources stored at each client device. The gateway router may maintain an index (e.g., a file index, an application index, etc.) of the data resources of each client device. The index may be stored in a profile associated with a client identity.

At 814, the method may include synchronizing the data resources among the two or more client devices associated with the client identity by copying one or more instances of the data resources between the two or more client devices over the local area network via the gateway router. Synchronization may be performed by the gateway router responsive to a request by one of the client devices associated with the client identity, or automatically responsive to identification of a data resource stored on one client device of the client identity not present on another client device of the client identity.

Figure 9:
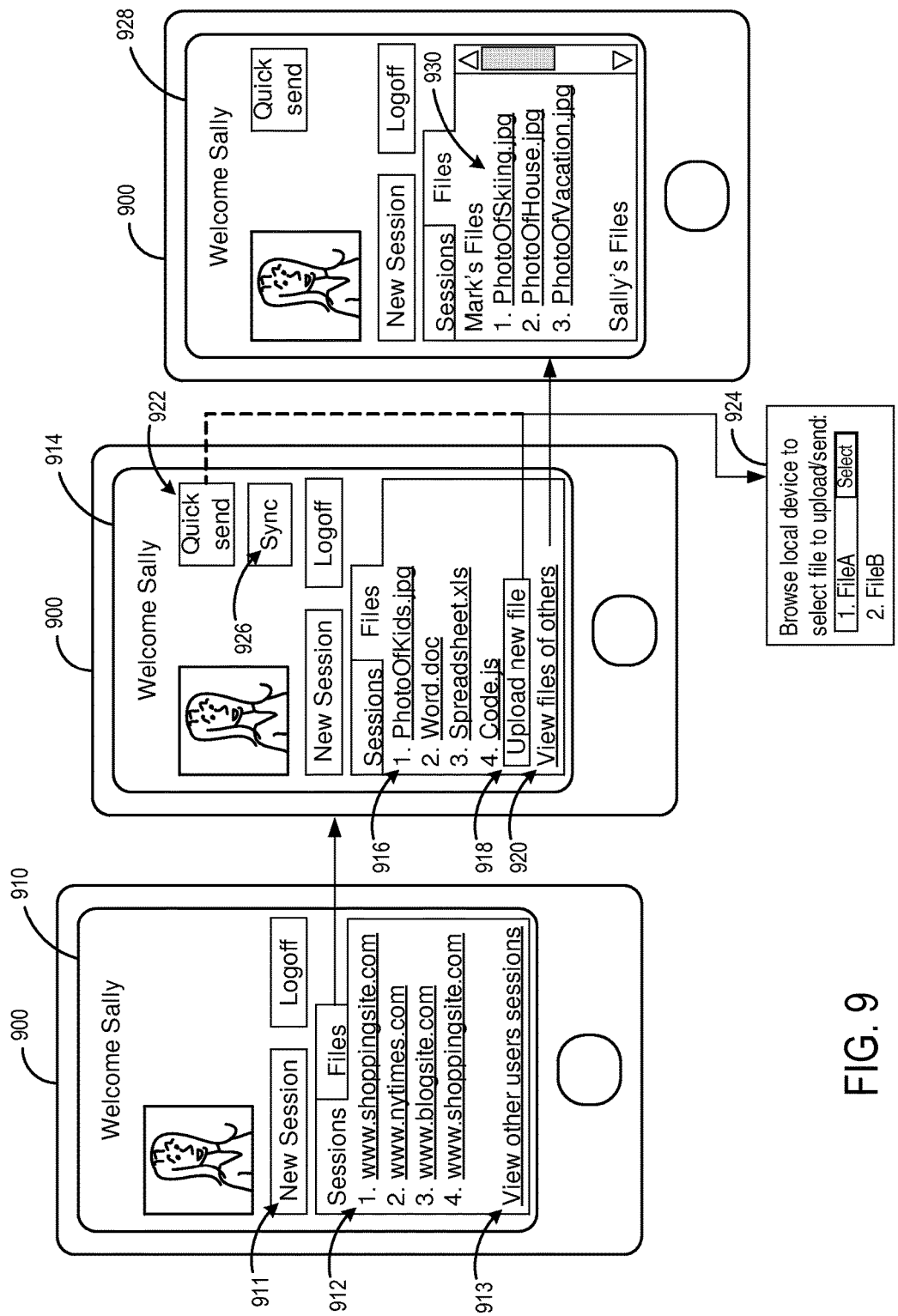
FIG. 9 is a schematic diagram depicting an example sequence of graphical user interfaces according to one disclosed embodiment.

FIG. 9 is a schematic diagram depicting an example sequence of graphical user interfaces (GUIs) according to one disclosed embodiment. Information presented via these GUIs may be served or otherwise sent to client devices of a LAN by the gateway router. These GUIs may be used to manage session hand-off and/or sharing of data resources among two or more client devices associated with a common client identity, or between two or more different client identities corresponding to different user accounts and/or different device identities according to permissions. These GUIs may provide users with an interface to the gateway router via their respective client devices.

Client device 900 is shown presenting graphical user interface (GUI) 910. An example user (e.g., Sally) may, for example, log-in to a client interface for the router that is presented as a GUI via client device 900 to access information stored in a profile of the client identity at the gateway router. As one example, user Sally may be represented by a client identity that takes the form of a user account. For example, user Sally may access a user account by providing user credentials (e.g., username and/or password) to the gateway router via client device 900. As another example, user Sally may be represented by a client identity that takes the form of a device identifier of client device 910 through which user Sally accesses the gateway router.

GUI 910 includes an existing sessions list 912. Sessions list 912 may be presented as a selectable "Sessions" tab as depicted, for example, in FIG. 9. Sessions list 912 provides an indication of existing network communications sessions associated with the client identity. For example, the client identity may have previously established network communications sessions via client device 900 or another client device associated with the client identity. Accordingly, these network communications sessions may have been previously established between client device 900 (or another client device associated with the client identity) and a network device of the WAN. Sessions list 912 may include one or more selectors (e.g., links) that indicate the existing network communications sessions available to the user. The existing network communications sessions may be represented by one or more Uniform Resource Locators (URLs) or other suitable Uniform Resource Identifiers (URIs).

User Sally may continue an existing network communications session from client device 900 by selecting a corresponding selector indicating an existing network communications session from sessions list 912. For example, responsive to selection of a network communications session from session list 912, the gateway router may establish continuation of the network communications session for client device 900 with a network device of the WAN based, at least in part, on state information stored in a profile of the client identity. User Sally may establish a new communications session, for example, by selecting selector 911 (e.g., "New Session").

GUI 910 further includes a selector 913 (e.g., "View other user's sessions") that enables a user to view network communications sessions of other client identities or user accounts. For example, another client identity (e.g., user Mark) may have granted the client identity (e.g., user Sally) permission to view and/or access network communications sessions of user Mark. User Mark's sessions list may be presented in a similar format to previously described sessions list 912. For example, user Sally may continue an existing communications session initially established by user Mark by selecting the communications session from user Mark's session list. User Sally may similarly manage permissions via the gateway router to enable other client identities (e.g., user Mark) to view and/or access existing network communications sessions established by user Sally.

GUI 914 includes a files list 916. Files list 916 may be presented as a selectable "Files" tab as depicted, for example, in FIG. 9. Files list 916 provides an indication of files associated with the client identity. For example, the client identity (e.g., user Sally) may have previously uploaded a file to the gateway router via client device 900 or another client device associated with the client identity. Files list 916 may include one or more selectors (e.g., links) that indicate the files associated with the client identity. These files may include, for example, image files (e.g., .jpg), word processing files (e.g., .doc, .xls, etc.), instructions set files (e.g., .js), among other suitable file types. A user may navigate between GUI 910 and GUI 914. For example, selection of "Files" tab in GUI 910 by the user causes the gateway router to send information to client device 900 to present GUI 914, which includes a list of files 916.

GUI 914 further includes a selector 918 (e.g., "Upload new file"), which enables user Sally to upload a new file from client device 900 to the gateway router via the LAN. The uploaded file may be associated with the client identity (representing user Sally as a user account and/or client device 900 as a device identifier) by the gateway router storing the uploaded file in the profile of the client identity. Files list 916 may be updated at GUI 914 to include the uploaded new file. GUI 924 provides an example of how a user may browse the contents of a storage device to select a file located at client device 900 to be uploaded to the gateway router. The gateway router may cause the client device to display a window of available data resources by which the user may select a data resource (e.g., a file) to send to the other client profile, client device, or user account.

GUI 914 further includes a selector 922 (e.g., "Quick send"), which enables user Sally to send a file to another client identity (e.g., another user represented by a user account and/or another client device represented by a device identifier). Responsive to selection of selector 922, files that are sent to another client profile associated with a target client identity may be stored in the client profile of the target client identity at the gateway router where the files may be retrieved by the target client identity (e.g., user or client device) associated with the target client profile. Alternatively, the file may be sent (e.g., pushed) to a user or client device associated with the target client identity via email, SMS, or other suitable communications format.

GUI 914 further includes a selector 926 (e.g., "Sync"), which enables user Sally to synchronize files across two or more client devices associated with her user account as previously described, for example, with reference to FIG. 7. For example, user Sally may transfer data, including files, applications, session state information, etc. among her client devices via the gateway router to update the data resources at each client device.

GUI 914 further includes a selector 920 (e.g., "view files of others") that enables a user to view and/or access files of other client identities. For example, another client identity (e.g., user Mark) may have granted the client identity (e.g., user Sally) with permission to view and/or access files of user Mark. User Mark's files list may be presented in a similar format to previously described files list 916. For example, GUI 928 includes a files list 930 for user Mark's files available to user Sally. User Sally may manage permissions via the gateway router to enable other client identities (e.g., user Mark) to view and/or access files uploaded to the gateway router by user Sally.

The GUIs of FIG. 9 may be accessed by users via a special purpose application program dedicated to controlling and managing the gateway router, or via a multi-purpose application program such as web browser or file browser. For example, these GUIs may be presented in a webpage viewing region of a browser, or in a menu system of the browser. As yet another example, the GUIs of FIG. 9 may be presented in a menu system or task bar of an operating system of a client device.

The example GUIs of FIG. 9 may be accessed by users in a number of ways, such as the through one or more of the previously described APIs. As one example, a user may navigate a client device to a well-known URI, or capture DNS. As another example, a user may enter a URL or URI (e.g., such as a malformed, but easy to remember URI) in a browser address bar (e.g., such as "ROUTER" or "SHARE"). The gateway router may be configured to intercept the DNS query and interpret the query as a SHARE command. In response to the SHARE command, the gateway router may be configured to serve a SHARE interface (e.g., one or more of the GUIs of FIG. 9) back to the client device that enables the user to share information with another user and/or client device of the LAN.

In some implementations, the gateway router can be configured to listen for commands, and serve GUIs in response to requests (e.g., the SHARE request) from a client device. For example, the gateway router may be associated with a number of functions, such as "SHARE", "SETTINGS", "PICKUP SESSION", etc. Each function may cause the gateway router to return a different functional interface to the client device or another client device of the LAN to be displayed to a user. For example, the SHARE GUI may include a list of other connected client devices, enabling a user to select a client device or user with which to share a data resource such as a hyperlink. The gateway router may be configured to insert a notification for destination users in a communication stream to enable sessions to be selectively maintained by the destination user. This feature may be implemented as browser buttons, selectors, or controls, for example.

In some implementations, the gateway router may be configured to transmit data to a LAN client representing a client interface (e.g., such as one or more of the GUIs of FIG. 9) responsive to receiving a request at a secret address (e.g., URL or URI) of the gateway router that was initiated by the LAN client. For example, a secret URL may take the form of or may be based on a shared secret between the gateway router and a client. A secret address may be programmatically generated by the gateway router or by an application operating on the client device, and/or the secret address may be at least partially user defined. A secret address may be changed over time (e.g., periodically or responsive to a condition) to increase security. The gateway router may support one or more secret addresses per client identity and/or one or more secret addresses per a user defined group of client identities. Two or more secret addresses for a given client may be used to distinguish between two or more different types of client interfaces that provide access to router functionality.

Figure 10:
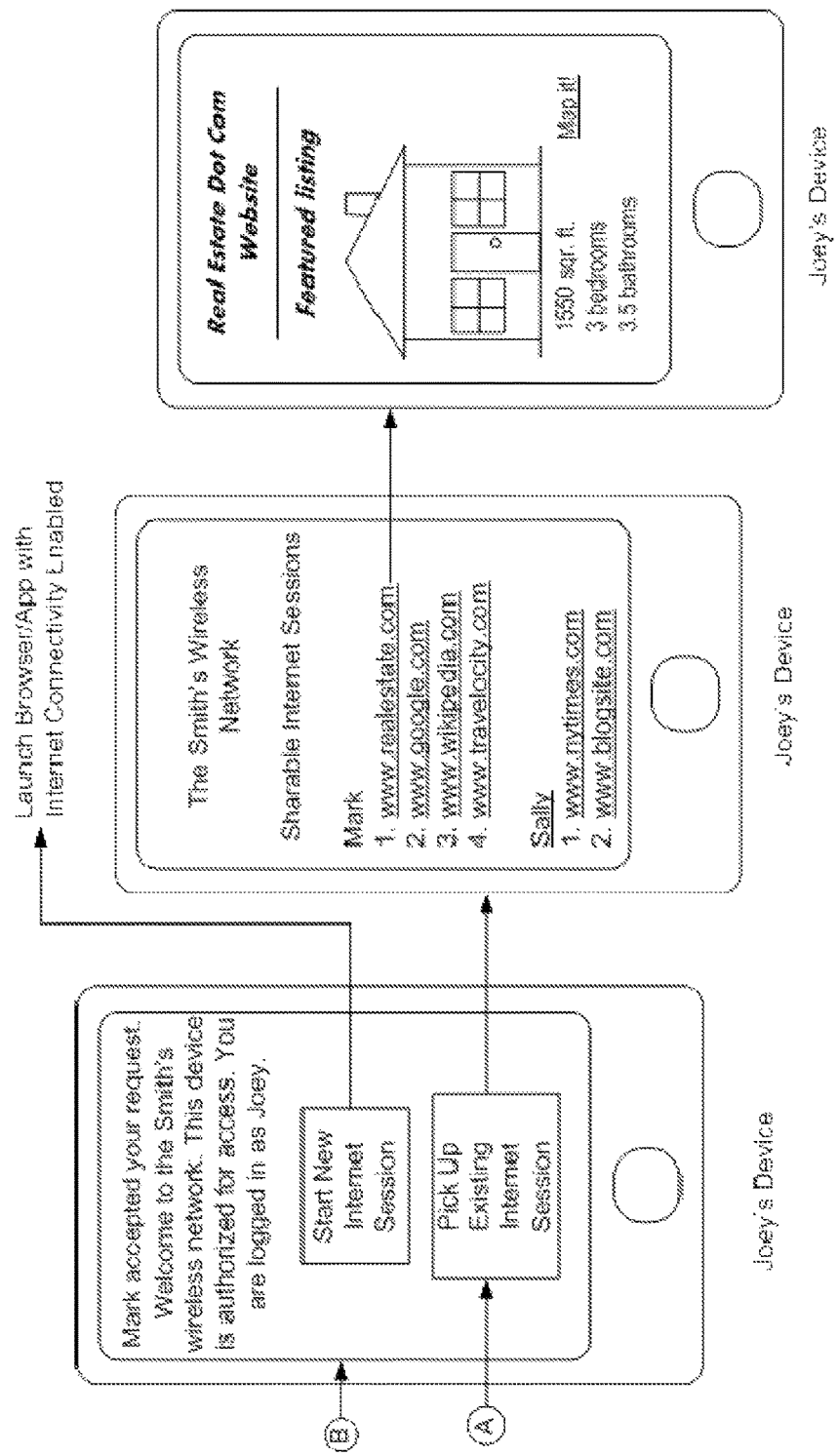
FIG. 10 illustrates an example user account log-in interface for a gateway router according to one disclosed embodiment.
Figure 11:
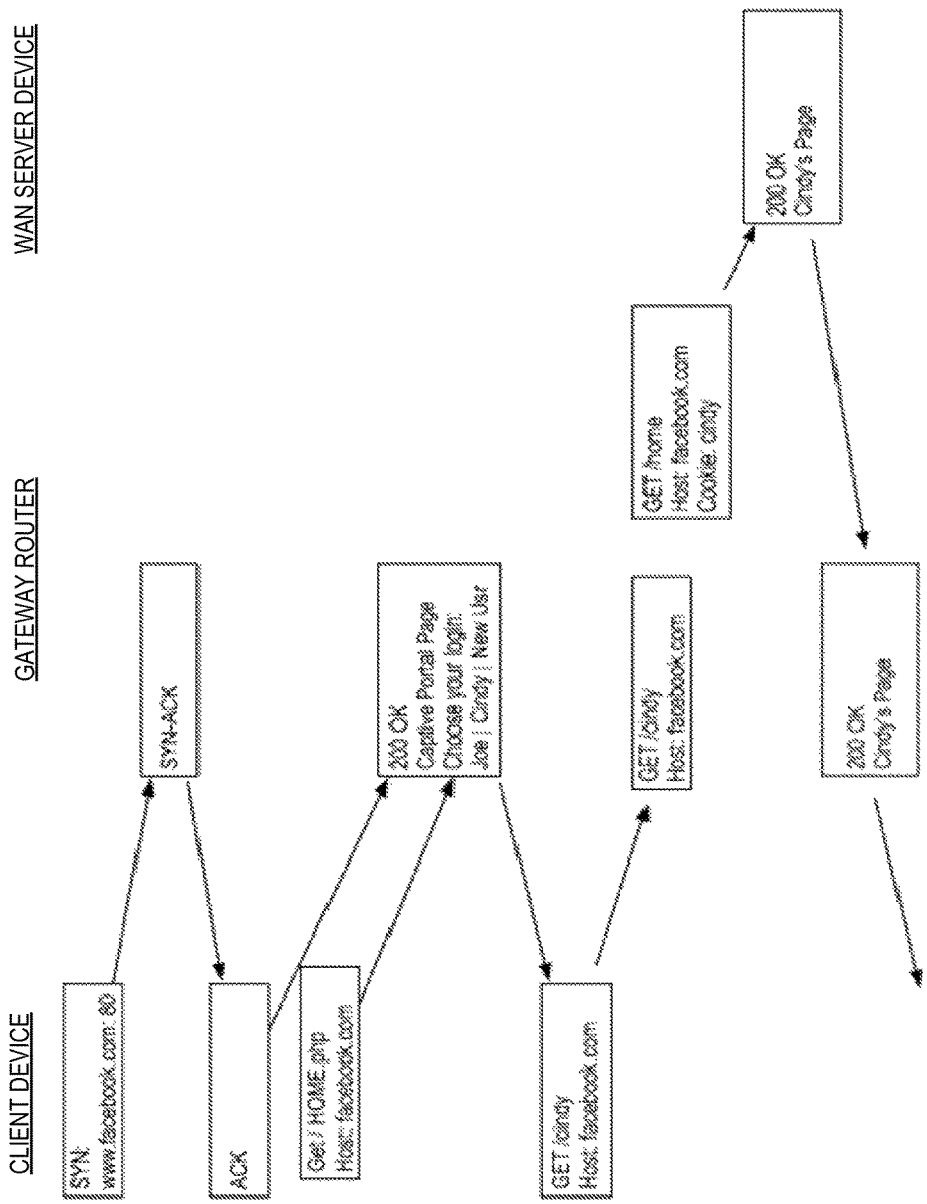
FIG. 11 illustrates an example communication flow between a client device, a gateway router, and a server device of a WAN according to one disclosed embodiment.

FIG. 10 depicts an example by which the gateway router may present a user account log-in interface. When a client device/user accesses the gateway router for example by attempting to send a request to access a resource at a destination server on the WAN, the gateway router modifies the request and presents a log-in interface to the requesting client device instead of immediately forwarding the request on to the destination server. FIG. 11 illustrates an example communication flow between a client device, the gateway router, and a server device of the WAN used to present the captive portal page for log-in to the gateway router.

It will be appreciated that according to the communication flow of FIG. 11, when a user starts a new browsing session from a new client device, or from a registered client device after a period of registered device inactivity, the gateway router may be configured to intercept the request, and prompt the user for the user credentials of the user account, and then passes the request and appropriate set of cookies to the destination website responsive to authentication of the user credentials.

The captive portal page with log-in interface can also function as way to switch between authorized users on registered client devices and to access existing user sessions. Those users may be prompted to acknowledge the existing sessions (e.g., "tap-to-continue") or may be required input additional user credentials. One example of a user credentials selection interface is illustrated in FIG. 10. Upon selection of an appropriate username, which may be password/biometrically protected if desired, a customized menu may served by the gateway router to the requesting client device showing cached sessions for the user from sessions initiated by the user on all client devices of the user's client identity that have connected through the gateway router. The user can then select to view an existing session, in which case the state of the cached webpage will be displayed, and cookies downloaded to the requesting device, so that any subsequent requests from that webpage will properly be sent to the network server of the WAN through the gateway router.

Figure 12:
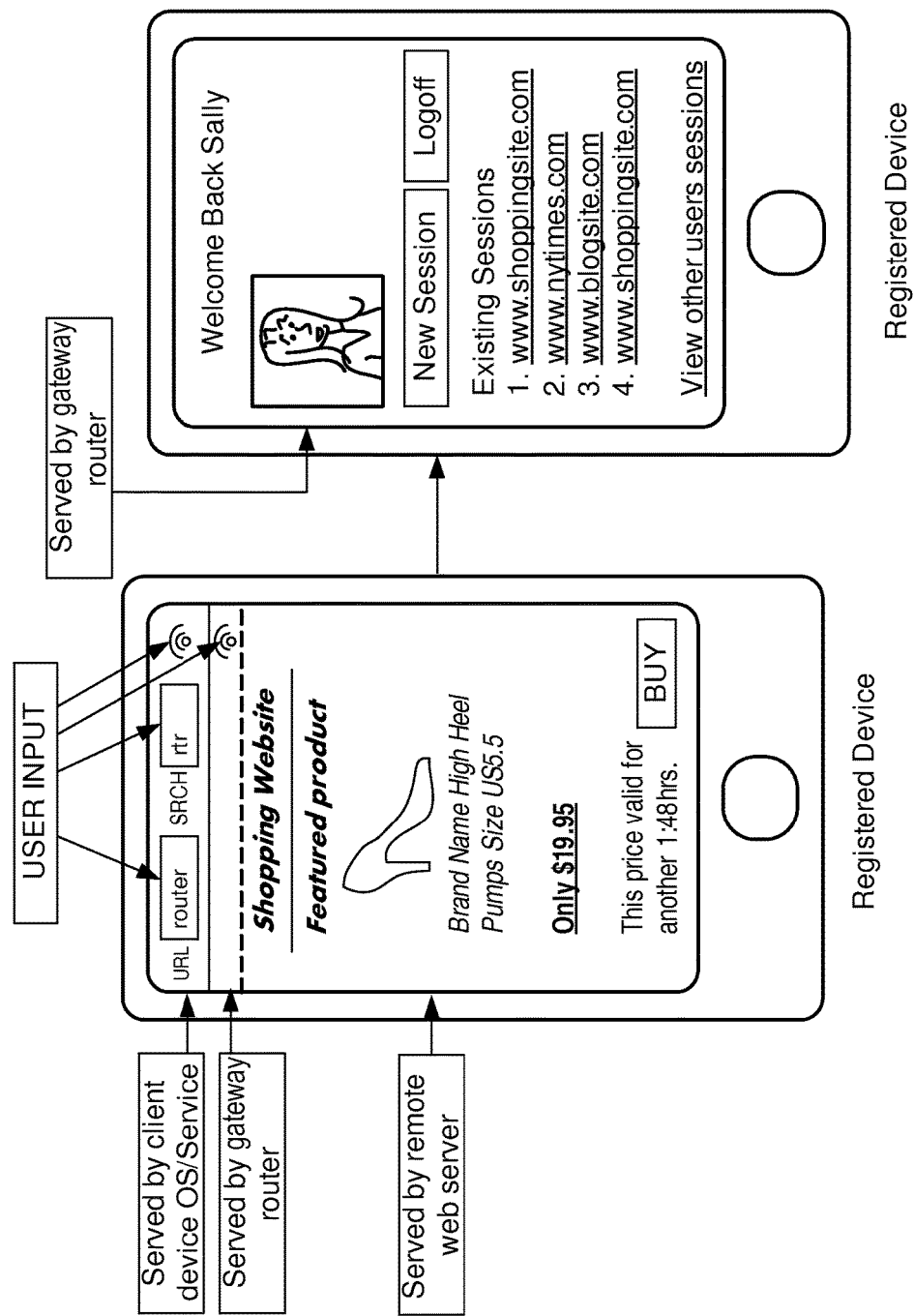
FIG. 12 illustrates an example client interface for users to access a gateway router according to one disclosed embodiment.

Once a user is registered, the gateway router may also provide a client interface to the router enabling users to access the gateway router to logoff from the existing user session, or to access other existing sessions of other client identities. FIG. 12 illustrates an example of such an interface, and various alternative mechanisms for accessing the interface. Generally, it is preferable for the client interface to the router to be as unobtrusive as possible during the user browsing experience, but accessible when needed. To that end, the gateway router may be configured to receive search bar entries, or address bar entries, that, when they contain a matching term, such as "router" or "rtr", for example, cause the gateway router to not send the search request or DNS query on to a remote server/DNS server. Rather, the gateway router may be configured to "eat" these requests and in response display the interface shown at the right in FIG. 12, which includes various links to access existing sessions. In addition, a dedicated selector icon for accessing the client interface to the gateway router may be provided proximate the address field/search field in the address/search bar. Selection of the icon may be configured to cause the interface at the right in FIG. 12 to be displayed. This bar, may be served by native programs on the client device, and may be scrolled in from off screen by a user to be unobtrusive. Alternatively or in addition, the gateway router may be configured to insert code into the web page code received from a network device of the WAN, to cause a selector for a client interface to the router to be displayed in a dedicated field proximate the web page, or within the web page itself. This dedicated field may be transparent until tapped/mouse-over, or could "fly in" or scroll in from off screen when tapped/mouse-over, so as to be as unobtrusive as possible.

The various client interfaces described herein may be used by a user of a client device to initiate API calls and/or other suitable commands to the gateway router (e.g., a WLAN router). For examples, a first message indicating a first API call of an API may be received at an operating system of the gateway router. The first message may be initiated by an application program operating at a first client device. Responsive to the first API call, the gateway router may send client interface information to the first client device via a WLAN. The client interface information may include one or more elements of a client interface (e.g., GUI) for controlling the WLAN router from the first client device.

A second message indicating a command initiated via the client interface at the first client device responsive to a user input may be received at the operating system of the gateway router. The command may be formatted according to any suitable communications protocol. Responsive to the command, the gateway router may perform a corresponding function at the gateway router. The corresponding function may include any of the previously described functions performed responsive to an API call. For example, the gateway server may perform a data resource storage function, a data resource retrieval function, a data resource transfer function, etc.

As previously described, a data resource transfer function (e.g., a file or session state transfer function) may direct the gateway router to send an instance of a data resource indicated by the data resource transfer command from a storage system of the WLAN router to a recipient client device indicated by the data resource transfer command. As another example, the command may include a profile update command in which information stored in a client profile at the gateway router is updated responsive to the profile update command.

The client interface may alternatively or additionally be used to initiate API calls. For example, the client device may initiate transmission of a second message over the WLAN, where the second message indicates a second API call generated responsive to a user input directed at the client interface. The client interface may be configured to initiate any of the previously described API calls or other suitable API calls.

Figure 13:
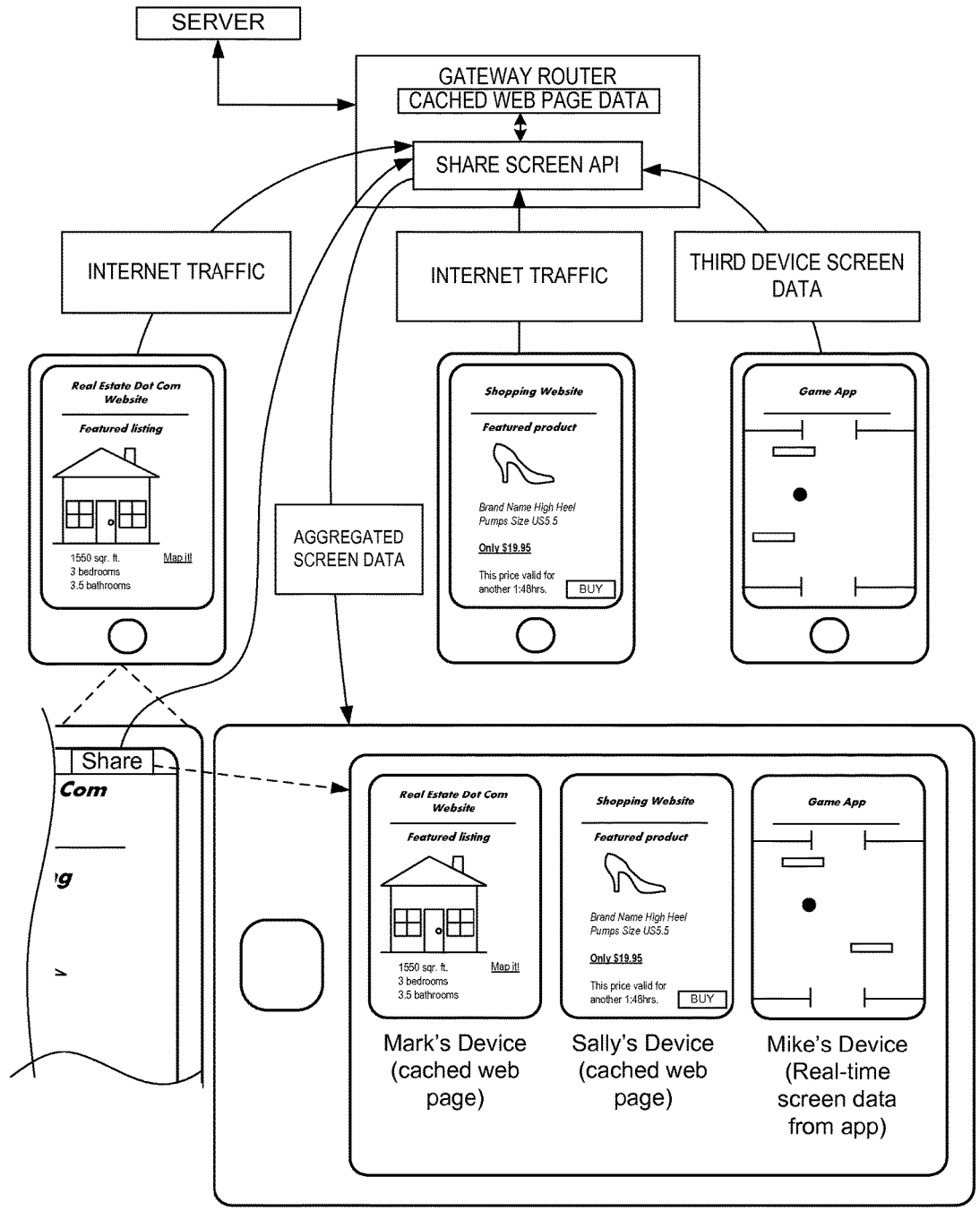
FIG. 13 illustrates an example share screen API by which a plurality of devices may share screen data via a gateway router.

FIG. 13 illustrates an example share screen API executed by the gateway router, by which a plurality of devices may share screen data via a gateway router. As shown internet traffic between a plurality of client devices travels through the gateway router to one or more remote servers over the WAN. Responses from the servers are stored at the gateway router as cached web data. Further, an application program executed on a client device such as the third client device may send display output to the gateway router, even when such output is locally generated on the client device and is not downloaded from the remote servers, as shown. A share screen selector ("share" button) may be provided in an application program graphical user interface displayed on the client devices. The share screen selector may be displayed, for example, in a menu or tool bar area of a browser graphical user interface, or within a web page served from the router to the client device, or at another suitable location on the client display.

Upon selecting the share screen selector, a request is sent from the client device to the gateway router for a share screen interface. In response, the gateway router responds by sending to the requesting client device a share screen interface, including previews of other client device displays. These previews are typically generated from cached web page data, and may also be generated from cached display data received from application programs on other client devices. The previews may be provided for all client devices currently connected to the gateway device, and may also be provided for client devices that were previously connected to the gateway router but are not longer connected. In this way a user may access a previous browsing session from another device. When the number of previews is large, the previews may be organized by user, time and date, device type, or cached content type (movies, web pages, games, etc.) and displayed within a multi-page hierarchical menu system.

By selecting one of the previews, the share screen interface is closed and the cached web page or application screen data is displayed typically in full screen mode on the client device via the appropriate browser or application program. From this point, the user may commence interacting with the cached web page or application screen data via the browser/application program executed on the user's client device. Thus, the user may commence interacting with the web page, playing a game, viewing a movie, viewing a document, etc. In this manner the share screen API allows users to share screen data between two or more users, between two or more devices of the same user, via the gateway router.

Figure 14:
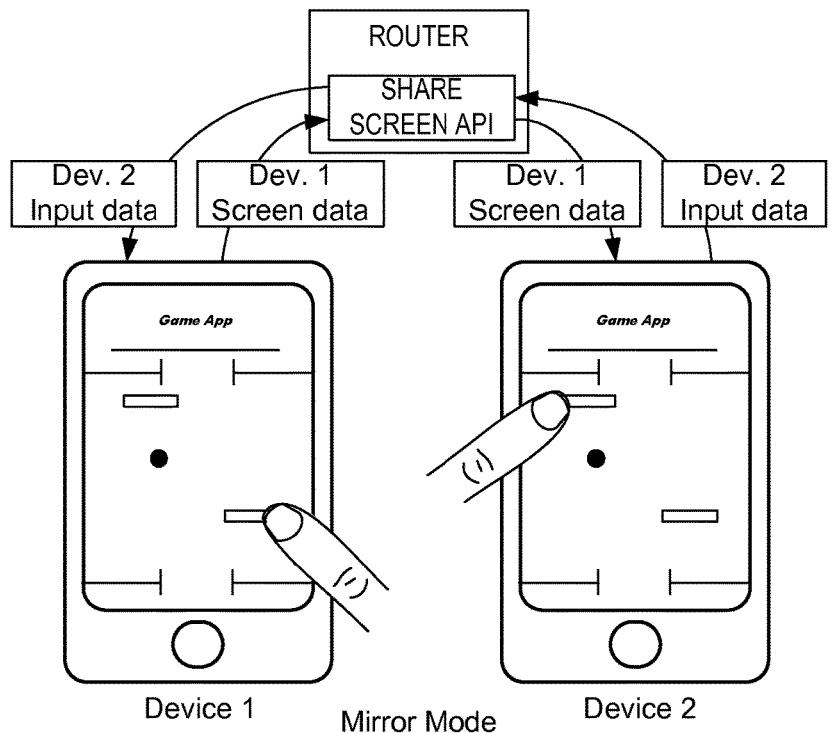
FIG. 14 illustrates an example mirror mode of the share screen API of FIG. 13, by which a plurality of devices may share a mirrored screen, with user input from each device being routed to a program that displays the output on each screen, the program being executed on either of the client devices, or on both in a distributed manner.

FIG. 14 illustrates an example mirror mode of the share screen API of FIG. 13, by which a plurality of devices may share a mirrored screen. This mode may be useful in game applications, and other applications in which users view a common display and manipulate respective elements of the display. In the illustrated example, screen data from an application program executed a first client device (e.g., a game screen) is sent from the first client device, via the share screen API of the gateway router, to a second client device for display. As a result, both the first and second client device display the first client device screen data. User input from the first client device is processed locally by the application program and accordingly to the processing, may affect the first client device screen data that is displayed on both devices. Thus, in the illustrated embodiment, when a first user touches a first GUI element on the screen of the first device, that GUI element is displayed as moving according to the touch input on both of the displays of the first and second client devices. Further, to enable a second user to concurrently interact with the application program, user input from the second user received at the second client device is routed back to the application program on the first client device via the gateway router share screen API. In this manner both users may control respective GUI elements of the application program, and both may view a mirrored output of the application program. Such a configuration enables, for example, multi-user gaming via a wireless gateway router.

Figure 15:
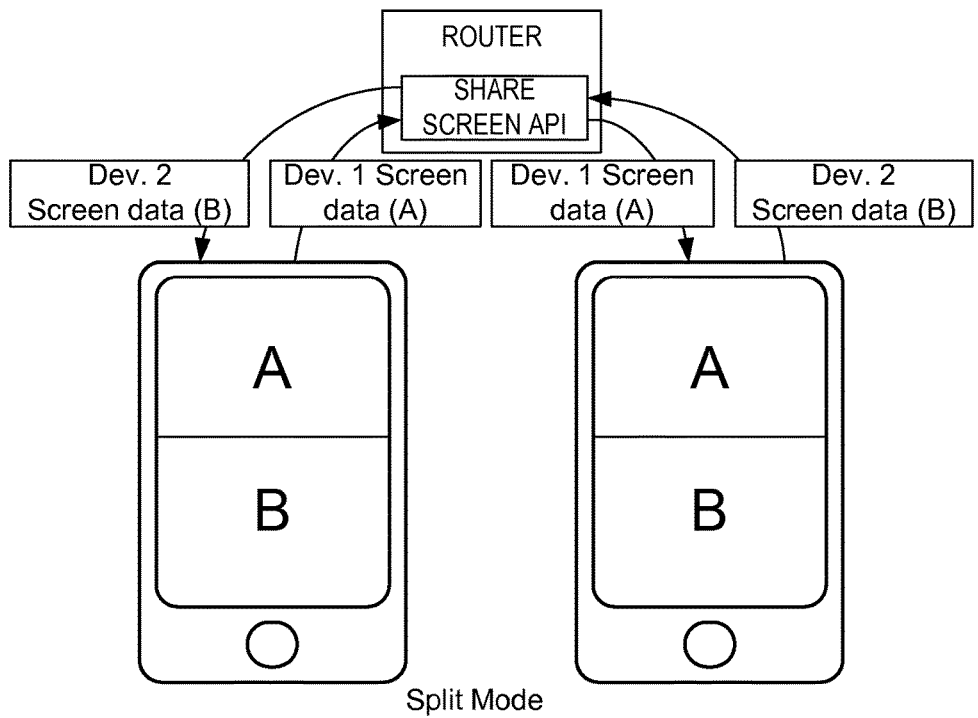
FIG. 15 illustrates an example split mode of the share screen API of FIG. 13, by which a plurality of devices may share a split screen, with display output from each device being displayed in respective split region of the client device and user input from each device being routed to a program that displays output on in the corresponding split region owned by the respective client device.

FIG. 15 illustrates an example split mode of the share screen API of FIG. 13, by which a plurality of devices may share a split screen, with display output from each device being displayed in respective split region of the client device and user input from each device being routed to a program that displays output on in the corresponding split region owned by the respective client device. In the split screen mode, the devices do not typically exchange user input data via the share screen API. Rather, each device sends its screen data to the other device via the share screen API, and the display output from each device is displayed concurrently. This may be useful, for example, to share a web page that a first user is viewing with another user, and vice versa. In this manner, users in the same physical location may share web or application content they are each viewing, and engage in a discussion. A couple engaged in a search for a restaurant for the evening may exchange screens with restaurant reviews for different restaurants, and select a restaurant that is to both of their liking, as one simple example.

Figure 16:
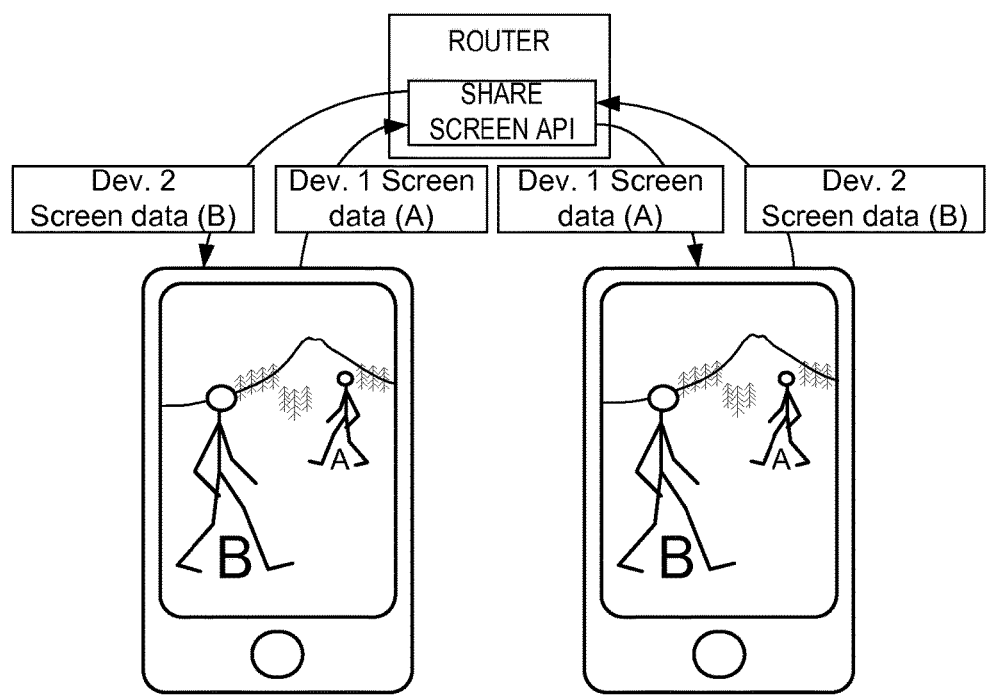
FIG. 16 illustrates an example overlay/sprite mode of the share screen API of FIG. 13, by which a plurality of devices may each output a display of a respective graphical object (A or B) that is displayed in an overlaid manner on a background, with the input from each device being routed to a program module that displays the object to move the object, etc., while the background is displayed by a program that may be executed in either client or on both clients in a distributed manner.

FIG. 16 illustrates an example overlay/sprite mode of the share screen API of FIG. 13, by which a plurality of devices may each output a display of a respective graphical object (A or B) that is displayed in an overlaid manner on a background. In this embodiment, it will be appreciated that a program executed either on the first or second client device (or possibly on each device in a distributed programming model) is displayed as a background on both devices. In the case where the first client device produces the background, the first client device sends the background, as well as overlay data for GUI element A (depicted as a user avatar A) to the second client device via the share screen API. The second client device displays the avatar A and the background, and also generates its own avatar B and displays it locally on the second client device, overlaid on the background and the GUI element A. Thus, a composite display consisting of the background, the GUI element A, and the GUI element B is displayed via the second client device. Concurrently, the second client device sends second client device screen data for the GUI element B to the first client device via the share screen API. The first client device, in turn, displays the GUI element B overlaid on the background and the GUI element A. In this manner, screen data from a plurality of devices may be aggregated and displayed as a composite display. The GUI element A and B, it will be appreciated, are under the control of user input from each respective device, and thus user input data need not be exchanged via the share screen API in this embodiment. Such a configuration may be useful, for example, in a multi-player gaming application in which multiple client devices connect and each user participates in the game via an appropriate player character avatar. The background and a first player character may be implemented by a first client device, and screen data for the remaining player characters may be exchanged and overlaid on the gaming environment. The screen share API may also contain a mechanism for game control data to be exchanged between the various devices, so that game logic may be executed on each client device, to enable a common gaming experience among the players.

It should be understood that the embodiments herein are illustrative and not restrictive, since the scope of the invention is defined by the appended claims rather than by the description preceding them. All changes that fall within metes and bounds of the claims or equivalence of such metes and bounds thereof are therefore intended to be embraced by the claims.

The invention claimed is:

1. A wireless local area network (WLAN) router located at a boundary of a WLAN and a wide area network (WAN), the WLAN router comprising:
a processor; and
a storage device holding instructions defining an operating system having an application programming interface (API) supporting a plurality of API calls, the instructions executable by
the processor to:
establish a first communications session with a first client device over the WLAN; authenticate the first client device with authentication information received from the first client device over the WLAN;
receive a first message over the WLAN from the first client device indicating a first API call of the API, the first message initiated by an application program operating at the first client device;

following authentication of the first client device, store an electronic file at the storage device of the WLAN router responsive to the first API call, the electronic file stored in association with a profile further associated with the first client device, the profile including permissions information indicating a sharing permission for a second client device, the electronic file being one of a plurality of electronic files stored in the profile associated with the first client device;

establish a second communications session with the second client device over the WLAN;

authenticate the second client device with authentication information received from the second client device over the WLAN;

receive a second message over the WLAN indicating a second API call of the API that corresponds to a synchronization function for synchronizing the plurality of electronic files between the first client device and the second client device;

reference the sharing permission for the second client device to determine whether the second client device is permitted to access the electronic file; and following authentication of the second client device and determination that the second client device is permitted to access the electronic file, send an instance of at least some of the plurality of electronic files stored at the storage device of the WLAN router in the profile associated with the first client device including the electronic file stored at the storage device of the WLAN router to the second client device over the WLAN responsive to the second API call to synchronize the plurality of electronic files between the first client device and the second client device.

2. The WLAN router of claim 1, wherein the first message includes the electronic file and/or the permissions information to be associated with the profile stored at the WLAN router.

3. The WLAN router of claim 1, wherein the instructions are further executable to:

receive a third message over the WLAN from the second client device indicating a third API call of the API, the third message initiated by an application program of the second client device; and responsive to the third API call, authenticate the second client device with the authentication information included in the third message before sending the instance of the electronic file to the second client device.

4. The WLAN router of claim 1, wherein the instructions are further executable to:

receive a third message over the WLAN from the first client device indicating a third API call of the API, the third message initiated by the application program of the first client device; and responsive to the third API call, authenticate the first client device with authentication information included in the third message before storing the electronic file at the storage device.

5. The WLAN router of claim 1, wherein the instructions are further executable to:

receive a data resource from a network device over the WAN, the data resource predicted by the WLAN router to be requested by the first client device at a later time based on state information obtained by the WLAN router from a previous session between the first client device and the network device;

store the data resource at the storage device;

receive a third message over the WLAN from the first client device indicating a third API call of the API, the third message initiated by the application program operating at the first client device; and following authentication of the first client device, send an instance of the data resource stored at the storage device to the first client device over the WLAN responsive to the third API call.

6. A method for a WLAN router located at a boundary of a WLAN and a wide area network, the method comprising:

establishing a communications session with a first client device over the WLAN;

authenticating the first client device with authentication information received from the first client device over the WLAN;

receiving at an operating system of the WLAN router, a first message indicating a first API call of an API, the first message initiated by a first application program operating at the first client device;

following authentication of the first client device and responsive to the first API call, sending client interface information to the first client device via the WLAN, the client interface information including one or more elements of a client interface for controlling the WLAN router from the first client device;

receiving at the operating system of the WLAN router, a second message indicating a command initiated via the client interface at the first client device responsive to a user input;

responsive to the command, storing an electronic file at a storage device of the WLAN router in association with a profile that is further associated with the first client device, the profile including permissions information indicating a sharing permission for a second client device, the electronic file being one of a plurality of electronic files stored in the profile associated with the first client device;

establishing a second communications session with the second client device over the WLAN;

authenticating the second client device with authentication information received from the second client device over the WLAN;

receiving a third message over the WLAN indicating a second API call of the API that corresponds to a synchronization function for synchronizing the plurality of electronic files between the first client device and the second client device;

referencing the sharing permission for the second client device to determine whether the second client device is permitted to access the electronic file; and following authentication of the second client device and determination that the second client device is permitted to access the electronic file, sending an instance of at least some of the plurality of electronic files stored at the storage device of the WLAN router in the profile associated with the first client device including the electronic file to the second client device over the WLAN responsive to the second API call to synchronize the plurality of electronic files between the first client device and the second client device.

7. The method of claim 6, wherein the second API call is received from the second client_device, the second API call being initiated by a second application program_operating at the second client device.

8. The method of claim 7, wherein the first application program operating at the first client device is a first web browser; and wherein the second application program operating at the second client device is a second web browser.

9. The WLAN router of claim 1, wherein the second message received over the WLAN was sent by the first client device.

10. The WLAN router of claim 1, wherein the second message received over the WLAN was sent by the second client device.

11. The method of claim 6, wherein the second API call is received from the first client device, the second API call being initiated by the first application program operating at the first client device.

* * * * *